United States Patent
Weijers et al.

(10) Patent No.: US 11,754,747 B2
(45) Date of Patent: Sep. 12, 2023

(54) SYSTEMS AND METHODS FOR HYBRID MODEL HYDRAULIC FRACTURE PRESSURE FORECASTING

(71) Applicant: Liberty Oilfield Services LLC, Denver, CO (US)

(72) Inventors: Leen Weijers, Denver, CO (US); Andrew Bonnell, Calgary (CA); Ely Lolon, Denver, CO (US); Zhijun Liu, Littleton, CO (US); Kam Agarwal, Denver, CO (US); Robert Henderson, Denver, CO (US); Michael Mayerhofer, Denver, CO (US)

(73) Assignee: LIBERTY OILFIELD SERVICES LLC, Denver, CO (US)

( * ) Notice: Subject to any disclaimer, the term of this patent is extended or adjusted under 35 U.S.C. 154(b) by 0 days.

(21) Appl. No.: 17/812,658

(22) Filed: Jul. 14, 2022

(65) Prior Publication Data

US 2022/0373711 A1  Nov. 24, 2022

Related U.S. Application Data

(63) Continuation of application No. PCT/US2022/072263, filed on May 11, 2022.

(60) Provisional application No. 63/187,212, filed on May 11, 2021.

(51) Int. Cl.
*G01V 99/00* (2009.01)
*E21B 47/06* (2012.01)
*E21B 43/26* (2006.01)

(52) U.S. Cl.
CPC .......... *G01V 99/005* (2013.01); *E21B 43/26* (2013.01); *E21B 47/06* (2013.01); *E21B 2200/20* (2020.05)

(58) Field of Classification Search
CPC ....... G01V 99/005; E21B 43/26; E21B 47/06; E21B 2200/20; E21B 2200/22
See application file for complete search history.

(56) References Cited

U.S. PATENT DOCUMENTS

| | | | |
|---|---|---|---|
| 10,989,835 B2 * | 4/2021 | Bailey | G01V 11/00 |
| 11,162,352 B2 * | 11/2021 | Shen | E21B 43/267 |
| 2015/0378052 A1 * | 12/2015 | Al-Ajmi | G06F 17/10 703/2 |
| 2017/0364795 A1 | 12/2017 | Anderson et al. | |

(Continued)

FOREIGN PATENT DOCUMENTS

CN  111125905 A  5/2020

OTHER PUBLICATIONS

Hu J, Khan F, Zhang L, Tian S. Data-driven early warning model for screenout scenarios in shale gas fracturing operation. Computers & Chemical Engineering. Dec. 5, 2020;143:107116. (Year: 2020).*

(Continued)

*Primary Examiner* — Eunhee Kim
(74) *Attorney, Agent, or Firm* — HAYNES AND BOONE, LLP

(57) ABSTRACT

A system for determining pressure in a hydraulic fracturing system for a well includes a processing module executing code and configured to receive a plurality of input parameters. The processing module can predict either a bottomhole pressure, based on statistical predictions and physics-based predictions, or a surface pressure based on the predicted bottomhole pressure.

26 Claims, 19 Drawing Sheets

(56) References Cited

U.S. PATENT DOCUMENTS

2020/0291774 A1 9/2020 Balan et al.
2020/0370423 A1* 11/2020 Li .......................... G06N 3/08

OTHER PUBLICATIONS

Clifton and Abou-Sayed, "A Variational Approach to the Prediction of the Three-Dimensional Geometry of Hydraulic Fractures," SPE/DOE-9879, dated May 27-28, 1981, 9 pages.
Clifton and Wang, "Multiple Fluids, Proppant Transport, and Thermal Effects in Three-Dimensional Simulation of Hydraulic Fracturing," SPE-18198, dated Oct. 2-5, 1988, 14 pages.
Cleary, "Comprehensive Design Formulae for Hydraulic Fracturing," SPE-9259, dated Sep. 21-24, 1980, 20 pages.
Cleary et al., "Development of a Fully Three-Dimensional Simulator for Analysis and Design of Hydraulic Fracturing," SPE/DOE-11631, dated Mar. 14-16, 1983, 12 pages.
Crockett et al., "A Complete Integrated Model for Design and Real-Time Analysis of Hydraulic Fracturing Operations," SPE-15069, dated Apr. 2-4, 1986, 13 pages.
Settari and Cleary, "Development and Testing of a Pseudo-Three-Dimensional Model of Hydraulic Fracture Geometry," SPE-10505, dated Nov. 1986, 30 pages.
Palmer and Luiskutty, "A Model of the Hydraulic Fracturing Process for Elongated Vertical Fractures and Comparisons of Results with Other Models," SPE/DOE-13864, dated May 19-22, 1985, 17 pages.
Thiercelin et al., "Simulation of Three-Dimensional Propagation of a Vertical Hydraulic Fracture," SPE/DOE-13861, dated May 19-22, 1985, 12 pages.
Smith et al., "Layered Modulus Effects on Fracture Propagation, Proppant Placement, and Fracture Modeling," SPE-71654, dated Sep. 39-Oct. 3, 2001, 14 pages.
Barree, "A Practical Numerical Simulator for Three-Dimensional Fracture Propagation in Heterogeneous Media," SPE-12273, dated Nov. 15-18, 1983, 12 pages.
Meyer, "Design Formulae for 2-D and 3-D Vertical Hydraulic Fractures: Model Comparison and Parametric Studies," SPE-15240, dated May 18-21, 1986, 18 pages.
Meyer, "Three-Dimensional Hydraulic Fracturing Simulation on Personal Computers: Theory and Comparison Studies," SPE-19329, dated Oct. 24-27, 1989, 18 pages.
Weijers et al., "The Rate Step-Down Test: A Simple Real-Time Procedure to Diagnose Potential Hydraulic Fracture Treatment Problems," SPE-62549, dated 2000, 11 pages.
Barree et al., "Holistic Fracture Diagnostics: Consistent Interpretation of Prefrac Injection Tests Using Multiple Analysis Methods," SPE-107877-PA, dated Apr. 4, 2008, 11 pages.
Mayerhofer and Economides, "Fracture Injection Test Interpretation: Leakoff Coefficient vs. Permeability Estimation," SPE-28562, dated Sep. 25-28, 1994, 10 pages.
Craig et al., "Fracture Closure Stress: Reexamining Field and Laboratory Experiments of Fracture Closure Using Modern Interpretation Methodologies," SPE-187038-MS, dated Oct. 9-11, 2017, 27 pages.
International Search Report and Written Opinion dated Aug. 30, 2022 issued in co-pending PCT App. No. PCT/US22/72263 (6 pages).

* cited by examiner

SYSTEMS AND METHODS FOR HYBRID MODEL HYDRAULIC FRACTURE PRESSURE FORECASTING

RELATED APPLICATIONS

This application claims priority to International Application No. PCT/US2022/072263 filed May 11, 2022 and U.S. application Ser. No. 17/662,939 filed May 11, 2022, both of which also claims the benefit of priority to U.S. Provisional Patent Application Ser. No. 63/187,212 filed May 11, 2021, which is hereby incorporated by reference to the same extent as though fully replicated herein.

BACKGROUND

1. Field

The presently disclosed instrumentalities pertain to the technique of hydraulic fracturing to stimulate production from a well that is drilled into subterranean rock, together with numerical modeling of hydraulic fracturing operations.

2. Description of the Related Art

Physics-based, parameterized-3D and full-3D models were developed in the 1980's and 1990's. Current versions of these models incorporate calculations for such things as multiple fracture growth and tip effects. These models are based upon mathematically defined physical relationships and provide flexibility to honor pressure-time history observations while benefiting from improvements in computing power. Computer codes have been historically developed and reported by a variety of industry groups. See, for example, references 1-12 as cited in the References section below. Fracpro®[1] is one example of a commercially available pressure forecasting software providing a physical model in the nature of a lumped 3D fracture model.

[1] Fracpro is a registered trademark owned by Stratagen, Inc., of Houston Tex.

Current practice is to run the physics-based models before a hydraulic fracturing operation to generate a forecast of parameters, especially a time-dependent array of surface or bottomhole treating pressure. FIG. 1 shows features of a physical modeling system 100 in which measured values of non-time dependent values ($Z_1$ to $Z_n$) are provided as model input values facilitating time-dependent forecasts or predicted values ($Y_1$ to $Y_n$) under conditions established by design parameters ($X_1$ to $X_n$). Collectively and as are known to the art by way of example, these various parameters may include flow rate, surface pressure, bottomhole pressure, frictional pressure losses, fluid density, viscosity, values characterizing the wellbore, fluid entry friction, geo-mechanical values such as Young's modulus and Poisson's ratio, as well as field data obtained from diagnostic fracture injection tests (DFITs), step down tests, or maps of these data taken from nearby analogous wells and other values commonly used in the art.

FIG. 2 shows how the physics-based model 100 is used. The model inputs 200 are submitted 202 to the CPU-based model 100 provided with program logic to calculate 204 an output 206 including forecast values of surface or bottomhole treating pressure. While the predicted surface pressure values are observable during the hydraulic fracturing operation, other calculated results parameters are rarely, if ever, directly observable. This is problematic where, for example, certain input parameters such as perforation size, temperature-dependent fluid rheological changes, and geo-mechanical values are, generally speaking, sourced as estimated values. Thus, even assuming that the mathematical portions of the models produce results that are correct, the calculations are nonetheless inexact because they are impacted by estimated values, as opposed to observed values. Moreover, while it may be possible to improve estimates by history-matching observed values for a past operation, this cannot be done in real time as the operation is underway. This especially the case when fracturing shale.

For these reasons, it has been suggested in the art to develop statistics-based pressure forecasting models. As shown in FIG. 3 by comparison to FIG. 1, a statistical model 300 generally does not rely upon the non-time dependent parameters $Z_1$ to $Z_n$ that are used in the physics-based model 100. Pressure forecasting based on designed job parameters therefore often requires time for real time models to stabilize sensitivity to typical fracture design parameters, especially since some of these sensitivities cannot be explored until later in the job, for example when pumping sand after pumping acid. FIG. 4 shows use of the statistical model 300 where inputs 400 of flow rate, frac fluid density and surface pressure are provided 402 to the statistical model 300 for calculations 404 to produce output 406 forecasting, for example, surface pressure or bottomhole pressure.

While not all such methods have been utilized in statistical modeling of hydraulic fracturing operations, various well-known machine learning techniques may be used to create a statistical model. These machine learning techniques include, by way of example, Auto Regressive Integrated Moving Average (ARIMA), linear regression, ensemble learning (Extreme Gradient Boosting (XGB)), neural network (Multilayer Perception (MLP), gated recurrent unit (GRU), convolutional neural network (CNN), long short term memory networks (LSTM), and long and short term time-series network (LSTNet). Generic models for performing these statistical analyses are available from a variety of open-source and private companies, such as Simulink® and Matlab®[2], SAS™[3], StatSim (a Web-based open-source software), R (a Web-based statistical computing language with open source modules overseen by the R Foundation, and XGBoost (a Web-based open-source platform developed by the XGBoost Contributors).

[2] Simulink® and Matlab® are registered trademarks owned by Mathworks, Inc. located in Natick, Mass.
[3] SAS™ is a trademark of the SAS Institute, Inc. located in Cary, Minn.

Generally speaking, the proposed purely statistical models operate independently of physical models, operating under a motif utilizing time-based data arrays of parameters that are relevant to pressure forecasting in a physical sense, but are studied apart from the use of equations based upon observed physical laws or relationships. The purely statistical algorithms utilize a training data set to form a model that is then, after training to inform the particular flavor of machine learning algorithm, inverted to form a predictive model. This methodology produces inherent inaccuracies—at least because, being driven by purely historical statistics without a base reference to a physical model, the models fail to adjust their forecasting output even when the relationship between outputs and each of the design input parameters ($X_1$ to $X_n$) contradict the observed data in the field. Such models lack credibility and operate in ways that may slow an operator's ability to recognize fracture pressure response together with other early-time indicators of downhole performance.

BRIEF SUMMARY

The presently disclosed instrumentalities overcome the problems outlined above and advance the art improving pressure management and forecasting in hydraulic fracturing operations. This improves pumping efficiency, for example, by avoiding or mitigating screen-outs and improves safety by better assuring that operational pressures do not exceed downhole pressure safety limits. These advantages are obtained by combining the two modeling techniques of physical and statistical modeling to achieve realtime or near real-time history matching as a hydraulic fracturing operation is underway.

In one embodiment, a system for forecasting pressures in a hydraulic fracturing operation for a well includes:

a processing module executing code and configured to:

receive specifications for performing a hydraulic fracturing operation on a well, the specifications forecasting an array of flow rate information for frac fluid over time;

submit the array of flow rate information to a model incorporating a statistically based multivariate relationship associating the design flowrate information to obtain calculation results including pressure results including at least one of a bottomhole pressure time based array and a surface pressure time based array, each of the pressure results being separable into pressure loss subcomponents, a system of multipliers for statistical normalization of the pressure loss subcomponents, and normalized pressure loss subcomponents obtained by multiplying the pressure loss subcomponents by corresponding members obtained from the system of multipliers;

provide normalized pressure forecast data on the basis of the normalized pressure loss subcomponents;

monitor observed pressure from the well as the hydraulic fracturing operation is underway by comparing the normalized pressure forecast data over time to the observed pressure from the well; and take responsive action when monitoring of the observed pressure indicates an impending screen-out.

In various aspect of the code, the array of flow rate information may embody calculation results obtained from a lumped 3D hydraulic fracturing model. The statistically based multivariate relationship may derive from a training data set incorporating historical data from at least one analogous hydraulic fracturing operation, this data including at least two of historical flow rate (Q), historical surface pressure data ($P_{surface}$), historic bottomhole pressure data ($P_{bottomhole}$), historical fracture multiplier relating perforation friction to flowrate ($k_{perf}$), historical multiplier relating near-wellbore friction to flowrate ($k_{nwb}$), bottomhole proppant concentration ($C_{BH}$), net pressure ($P_{net}$), friction reducer concentrate (FR), and fracture closure pressure ($\sigma_{closure}$).

In one aspect, the model may embody training data including historical information from diagnostic fracture injection tests, and the statistical model includes code relating the historical information from diagnostic fracture injection tests to new data obtained from a diagnostic fracture injection test performed on the well.

In one aspect, the model may embody training data including historical information from stepdown tests, and the statistical model includes code for relating the historical information from diagnostic fracture injection tests to new data obtained from a stepdown test performed on the well.

In one aspect, the training data set may include data from various sources that are analogous to the well that is undergoing the hydraulic fracturing operation. For example, training data set may include historical data from a prior stage of hydraulic fracturing performed on the same well, or in real time from the same stage as the hydraulic fracturing operation on that stage remains underway.

In one aspect, the relationships show in Equations (3) and (4) may characterized the characterize the pressure results and pressure loss subcomponents:

In various aspects, the system of multipliers may include at least one relationship for determining net pressure multipliers ($M_{net}$) for mitigating error from statistical modeling of net pressure ($P_{net}$) based upon data obtained from stepdown tests performed on the plurality of wells. The system of multipliers may also include includes at least one relationship for mitigating error in pressure loss from wellbore friction ($P_{wellfriction,Q,C}$) as a function of flowrate (Q). The system of multipliers includes at least one relationship for mitigating error in pressure loss from wellbore friction ($P_{wellfriction,Q,C}$) as a function of bottomhole proppant concentration ($C_{BH}$).

In one embodiment, the system initiates the appropriate action as an alarm to alert a user when the risk of screen-out is elevated. The code may be further configured to interact with a user through use of a graphical user interface to facilitate the appropriate action including at least on action is selected from the group consisting of: (1) adding friction reducer to the frac fluid, increasing the flow rate of the frac fluid, and reducing proppant concentration in the frac fluid.

In one aspect, the responsive action is triggered as a result of threshold analysis, such as a probabilistic threshold or a comparison of pressure slopes. The probabilistic may be based upon a Gaussian distribution of pressure results calculated by the statistical model.

The system as described above may operate to perform a method comprising steps of:

receiving specifications for performing a hydraulic fracturing operation on a well, the specifications forecasting an array of flow rate information for frac fluid over time;

submitting the array of flow rate information to a model incorporating a statistically based multivariate relationship associating the design flowrate information to obtain calculation results including pressure results including at least one of a bottomhole pressure time based array and a surface pressure time based array, each of the pressure results being separable into pressure loss subcomponents, a system of multipliers for statistical normalization of the pressure loss subcomponents, and normalized pressure loss subcomponents obtained by multiplying the pressure loss subcomponents by corresponding members obtained from the system of multipliers;

providing normalized pressure forecast data on the basis of the normalized pressure loss subcomponents;

monitoring observed pressure from the well as the hydraulic fracturing operation is underway by comparing the normalized pressure forecast data over time to the observed pressure from the well; and taking responsive action when monitoring of the observed pressure indicates an impending screen-out.

Code for performing the foregoing method may reside on a non-transitory computer readable medium.

DETAILED DESCRIPTION

The presently disclosed instrumentalities teach by way of example, not by limitation. In many of the embodiments described herein, systems and methods are provided that focus on creating a hybrid model for predicting well pressure events. One of the most important of these events is a screen-out. Screen-outs typically cause the pump pressure levels to rise unexpectedly and significantly. This may damage the wellhead equipment and requires time consuming/costly procedures to remove any obstructions or other issues. In many configurations, the hybrid model combines statistical models and observational models. By combining these two models, a wider variety of pressure events may be accurately detected, especially screen-outs. In many configurations, the statistical models predict well pressure operating conditions based on pressure loss subcomponents and multipliers normalize the contribution of these subcomponents, such that the well may operate smoothly, while the observational models assist in predicting unexpected events that depart from the statistical models. Such unexpected events may trigger alarms or automatic remediation of pumping conditions.

Figure 1:
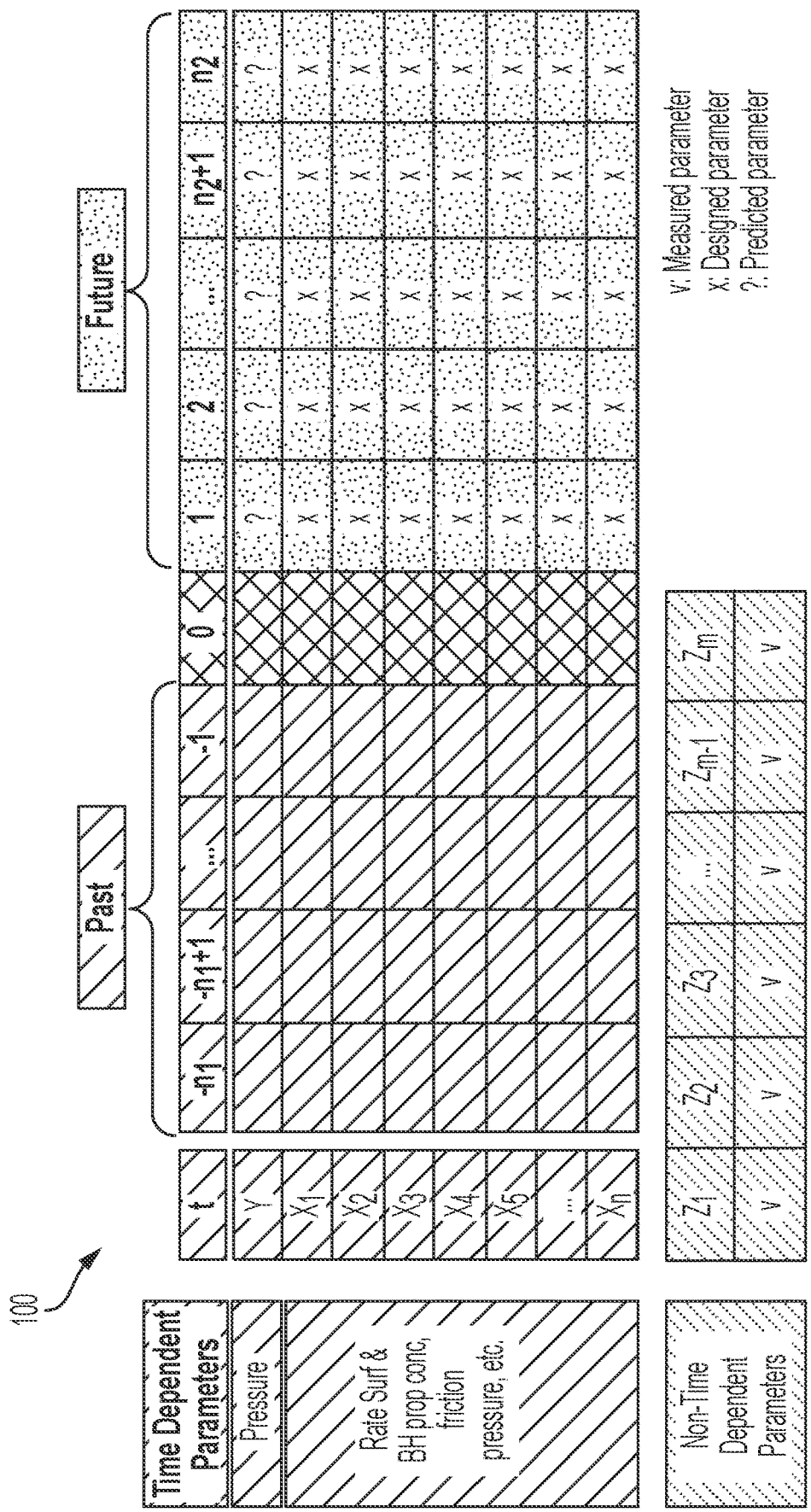
FIG. 1 shows one embodiment of a prior art model for input parameters for physics-based fracture models to predict surface and bottomhole pressure.
Figure 2:
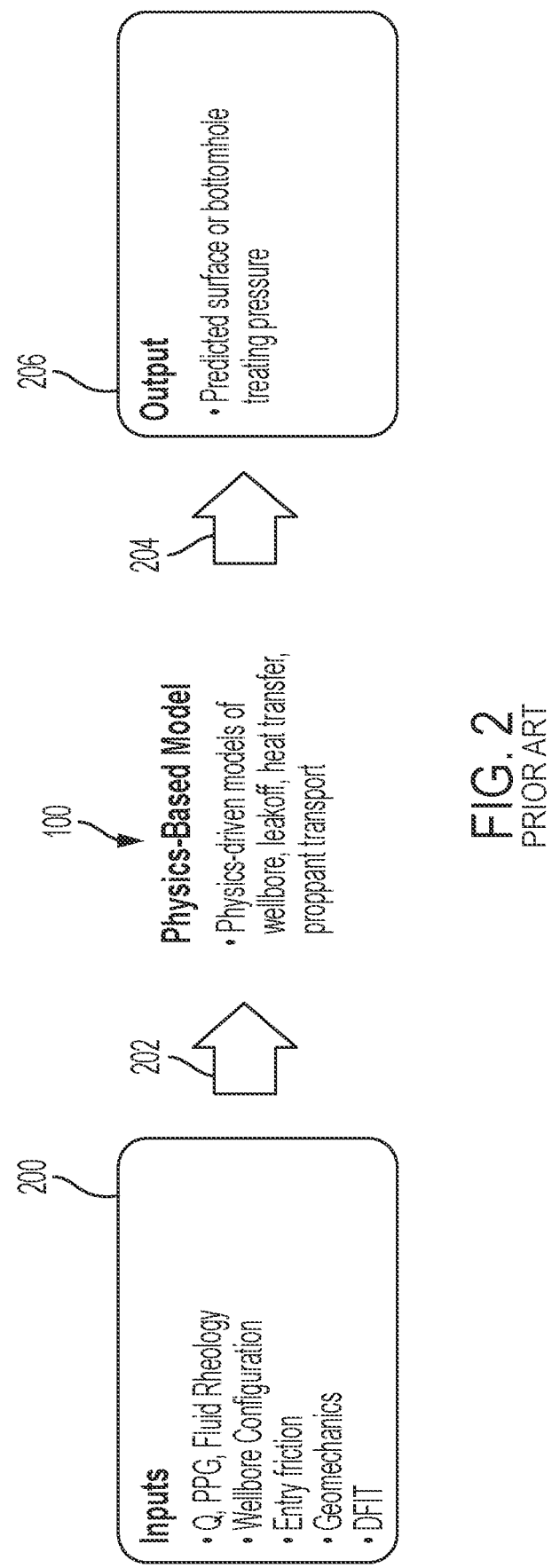
FIG. 2 shows an input-output data flowchart for physics-based fracture models of the prior art that may be utilized to predict surface and bottomhole pressure.
Figure 3:
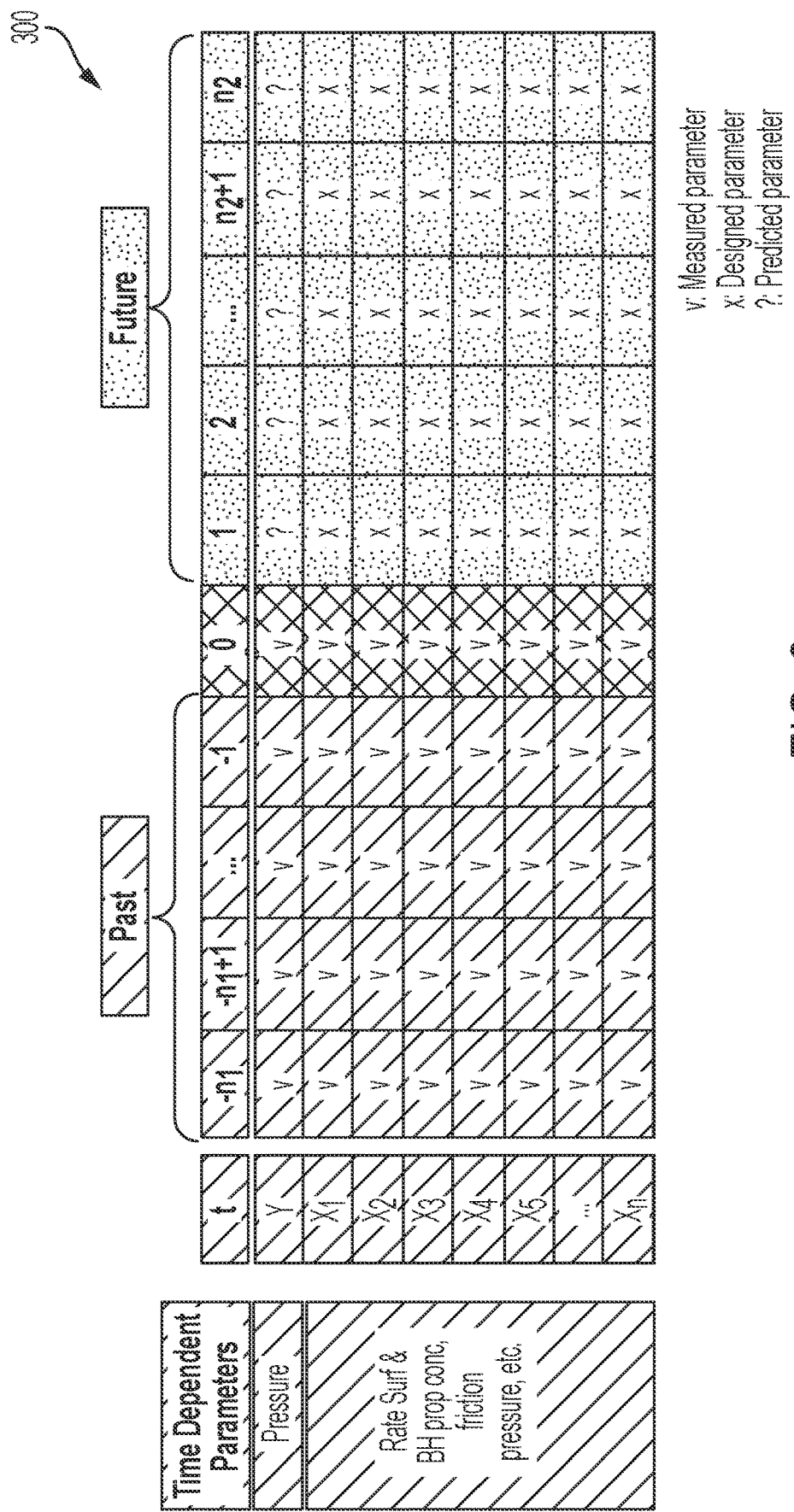
FIG. 3 shows an example of parameters for purely statistics-based fracture models of the prior art that may be utilized to predict surface and bottomhole pressure.
Figure 4:
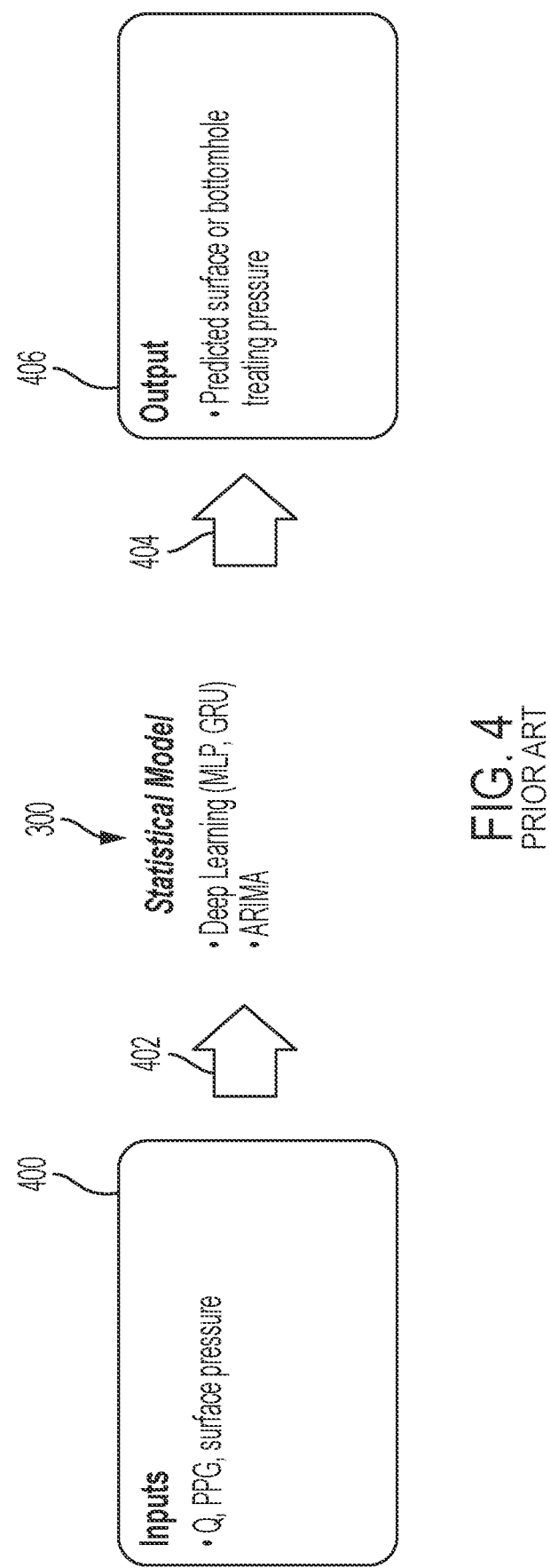
FIG. 4 shows an example of input-output data flowchart for statistics-based fracture models to predict surface and bottomhole pressure.
Figure 5:
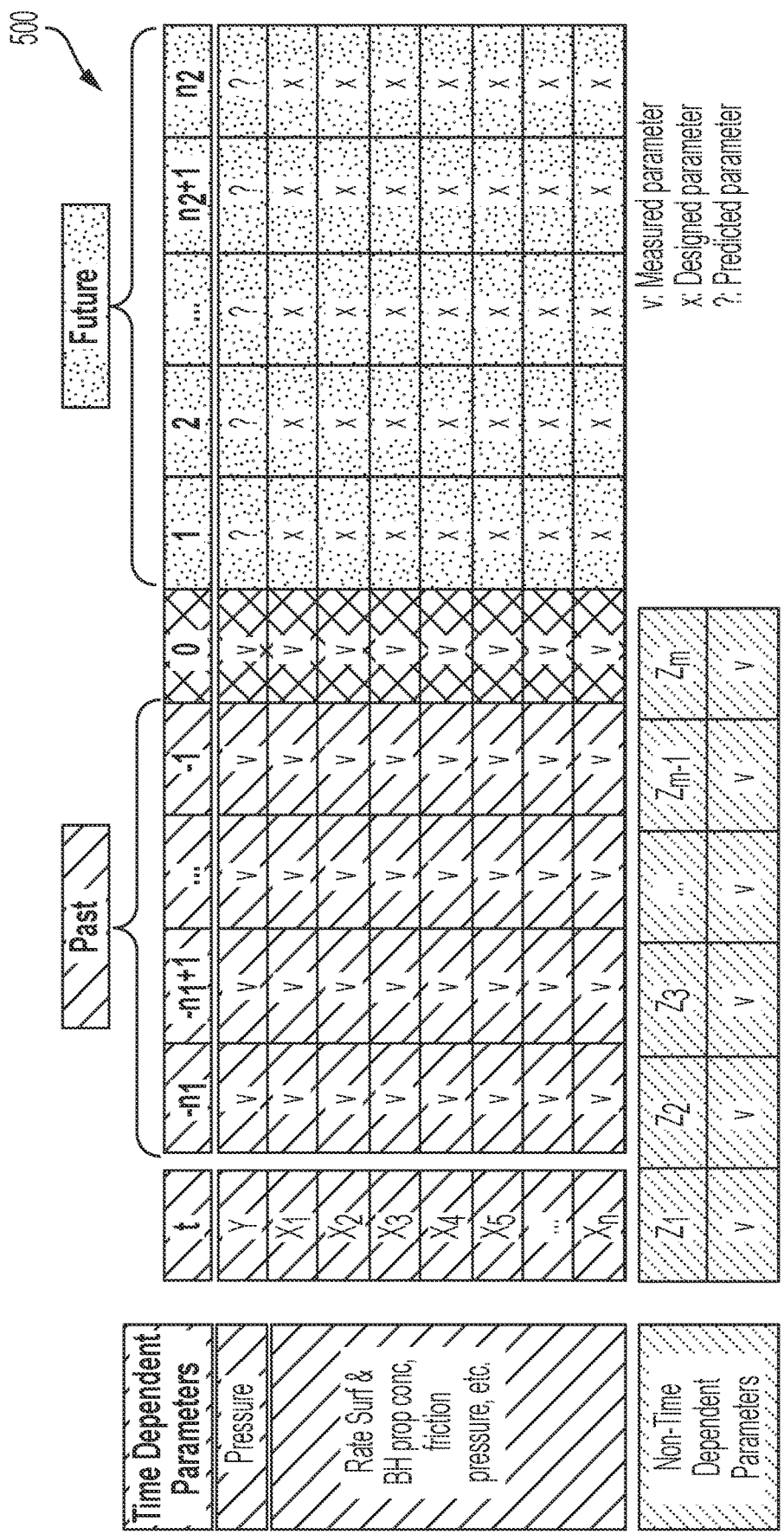
FIG. 5 shows a hybrid model according to the presently disclosed instrumentalities, the model combining features of statistical modeling and physics-based modeling.

FIG. 5 shows features of a hybrid model 500 according to the present disclosure. The hybrid model 500 incorporates statistical calculations derived from machine learning algorithms where the statistical model may be trained using observed historical values for time dependent parameters Y and $X_1$ to $X_n$. The model 500 also performs physical modeling using non-time dependent parameters $Z_1$ to $Z_n$. The combined statistical and physical components output forecast values Y as represented by the "?" symbol in FIG. 5 resulting from design parameters represented by an "x." Suitable time-dependent parameters may include, for example, a measured surface pressure ($P_{surface}$), a bottomhole pressure ($P_{bottomhole}$) that may be directly measured or, more commonly, back-calculated from the measured surface pressure by use of a physical model, flowrate (Q) of injected frac fluid, surface proppant concentration in the frac fluid ($C_{Surf}$), bottomhole proppant concentration in the frac fluid ($C_{BH}$), frac fluid density ($\rho_s$), concentration of friction reducer (FR) in the frac fluid, and viscosity of the frac fluid, together with any of the other time-dependent parameters discussed below.

Figure 6:
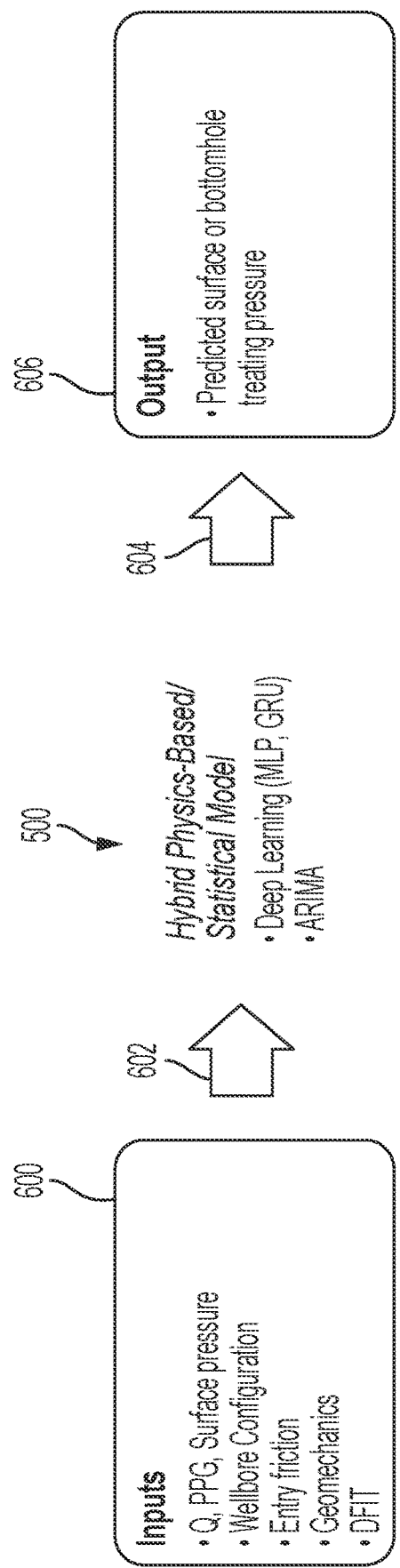
FIG. 6 shows an input-output data flowchart for the hybrid model.

FIG. 6 shows use of the hybrid model 500 where model inputs 600 are submitted 602 to the CPU-based model 500 which is provided with program logic to calculate 604 an output 606 including forecast values of surface or bottomhole treating pressure. The model 500 independently calculates the parameters Y using the physical model 100 and the statistical model 300 as described above.

Figure 7:
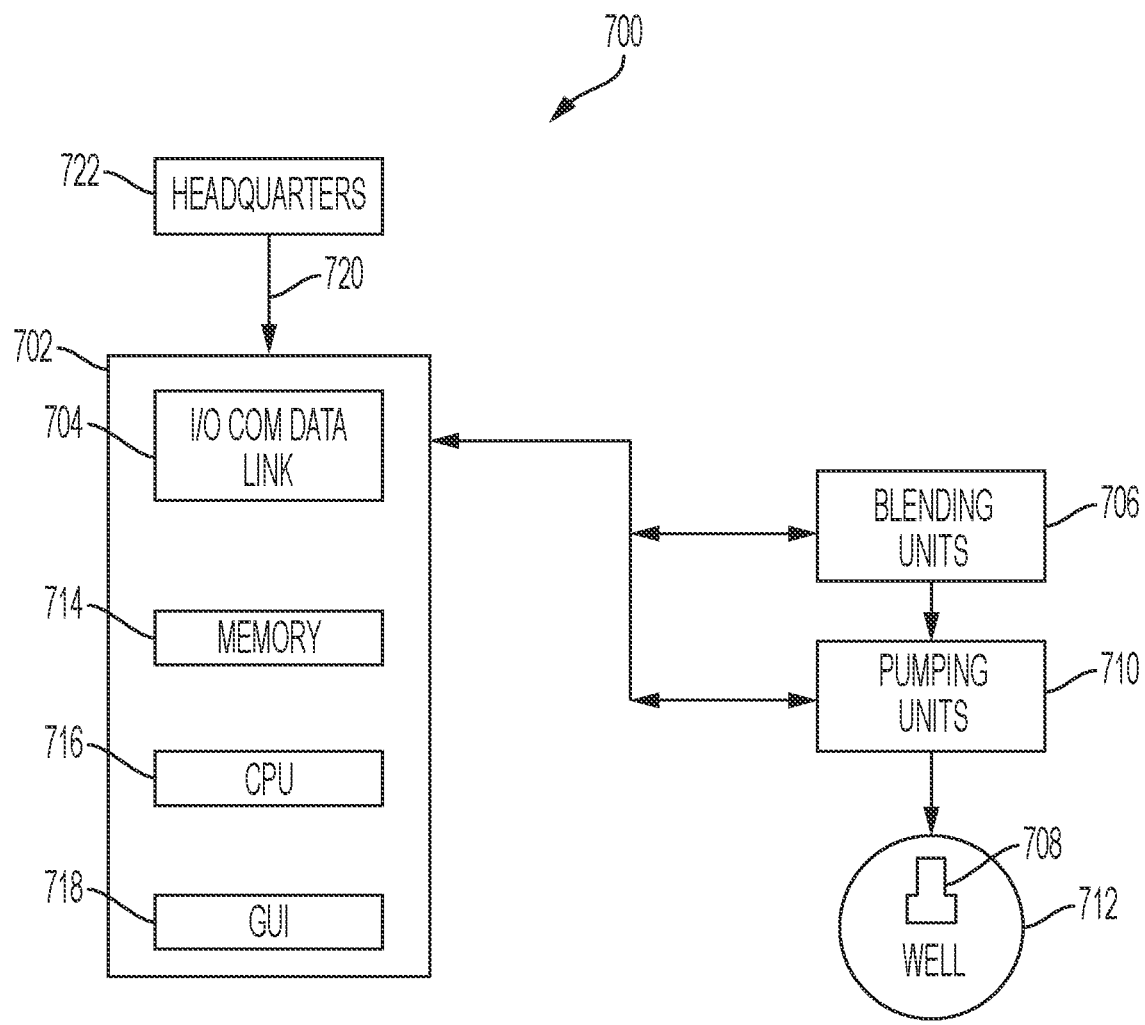
FIG. 7 shows a CPU-based system including a computing module configured with program logic implementing the hybrid model.

FIG. 7 shows a system 700 configured with a computing module 702 for implementing the hybrid model 500 as discussed herein. The computing module 702 includes a data link 704 facilitating input/output communications with frac fleet equipment including a plurality of blenders 706 feeding frac fluid 708 to an array of pressure pumping units 710 which, in turn deliver the frac fluid 708 to a well 712 for use in treating the well 712 according to the instrumentalities described herein. A digital memory bank 714 is operably coupled with a central processing unit 716 to implement program instructions that operationally implement performance of the hybrid model on the system 700 in real time or near real time as a well is undergoing treatment. A graphical user interface 718 provides input/output functionality communicating with a person acting as the frac operator who may be, for example, a sand master, frac crew foreman, or frac field engineer. The system 700 may be mounted at a single location, such as a frac control van or one of the pumping units 710 (not shown), or in a distributed system with different components mounted on separate pieces of equipment.

It is also possible, by way of example, for the data link 704 to communicate wirelessly 720 with a central headquarters 722 from which multiple hydraulic fracturing operations are being directed. By virtue of this expedient, as facilitated by an alarm to alert the frac operator of an impending screen-out to be discussed below, a single person may remotely supervise a plurality of hydraulic fracturing operations—each being performed on a single well.

Working Examples of Purely Statistical Models

Figure 8:
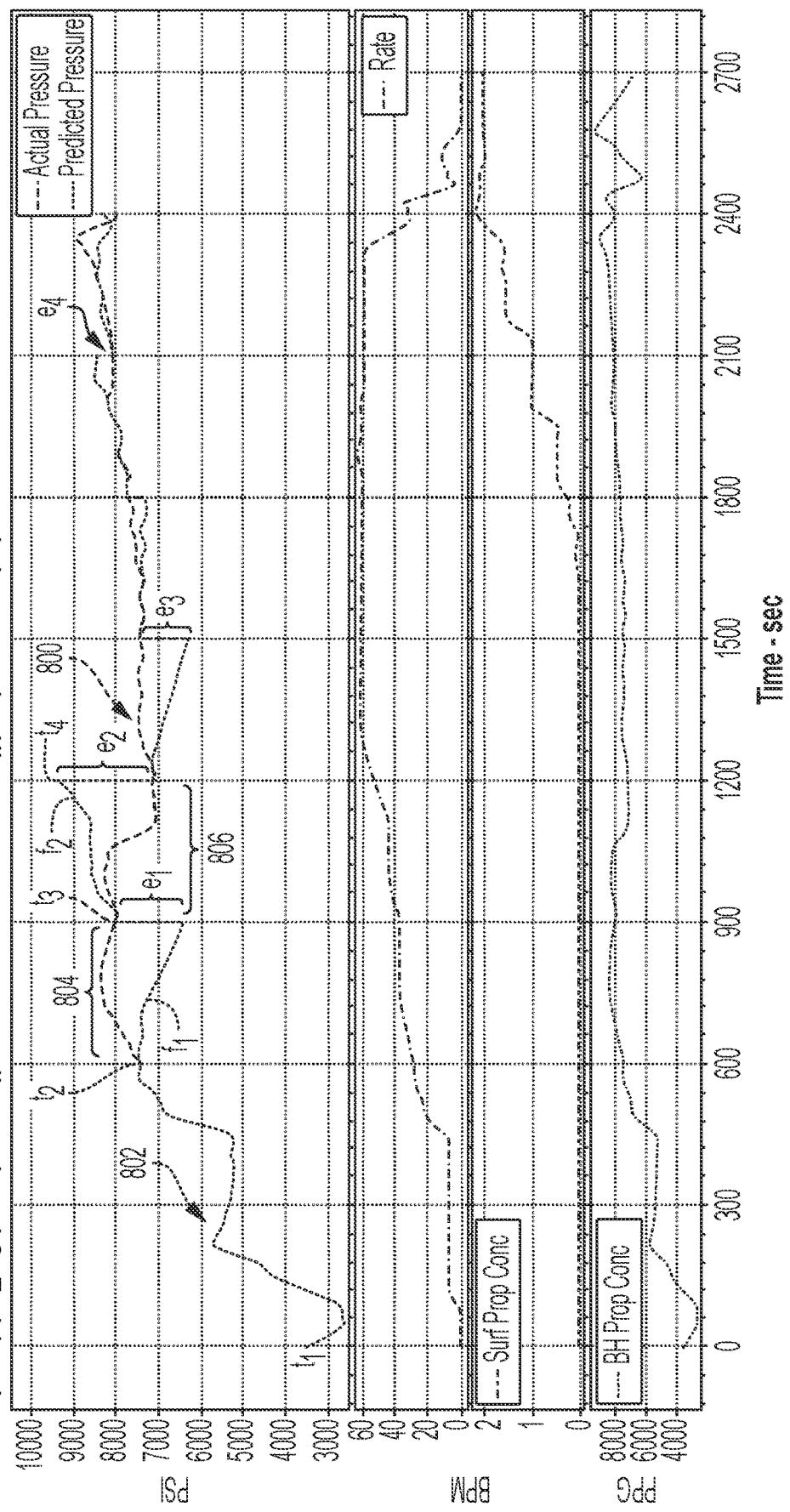
FIGS. 8, 9, and 10 show three examples of fracture treatment pressure forecasting purely based on real time statistical models.
Figure 9:
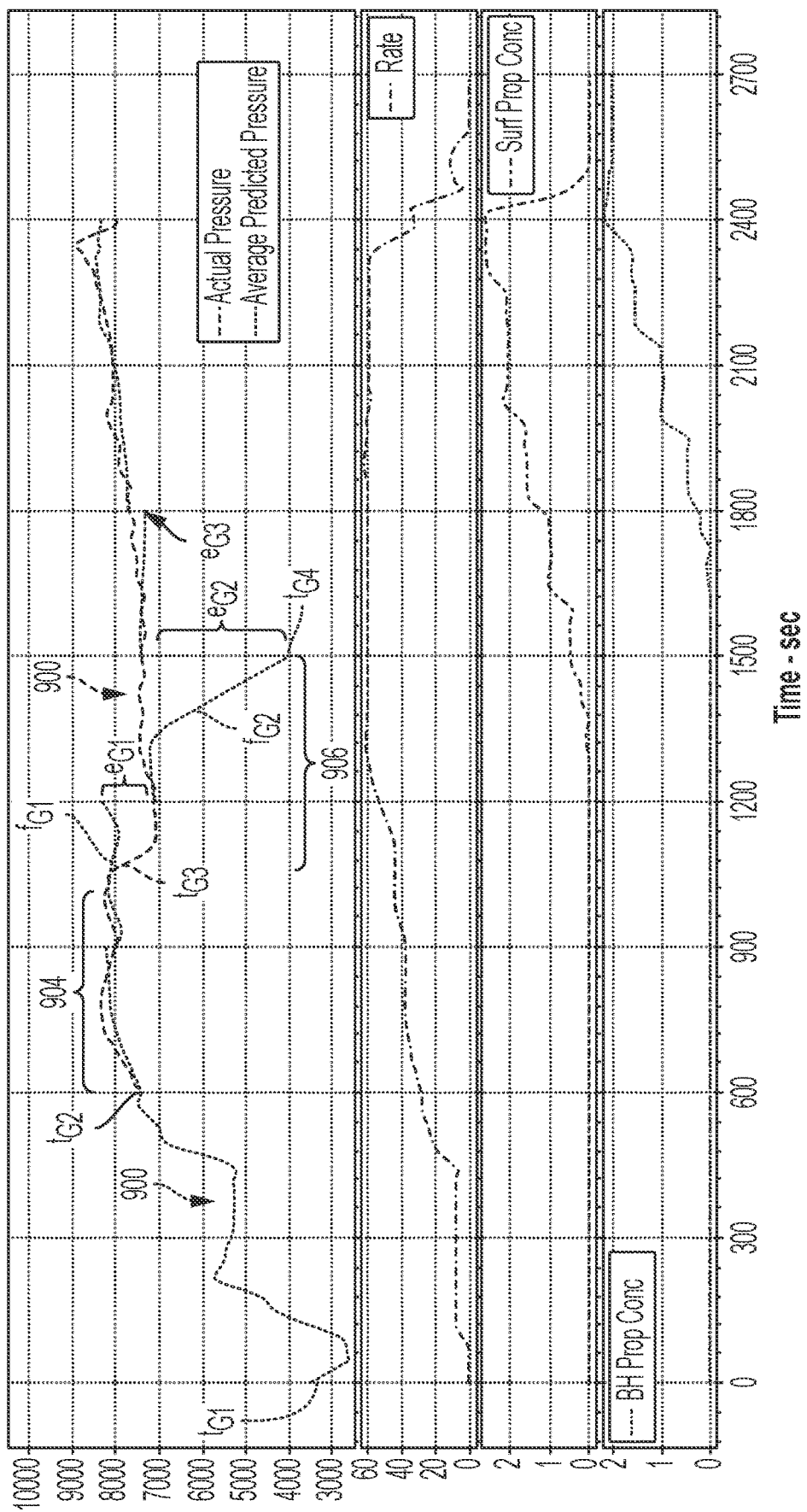
Figure 10:
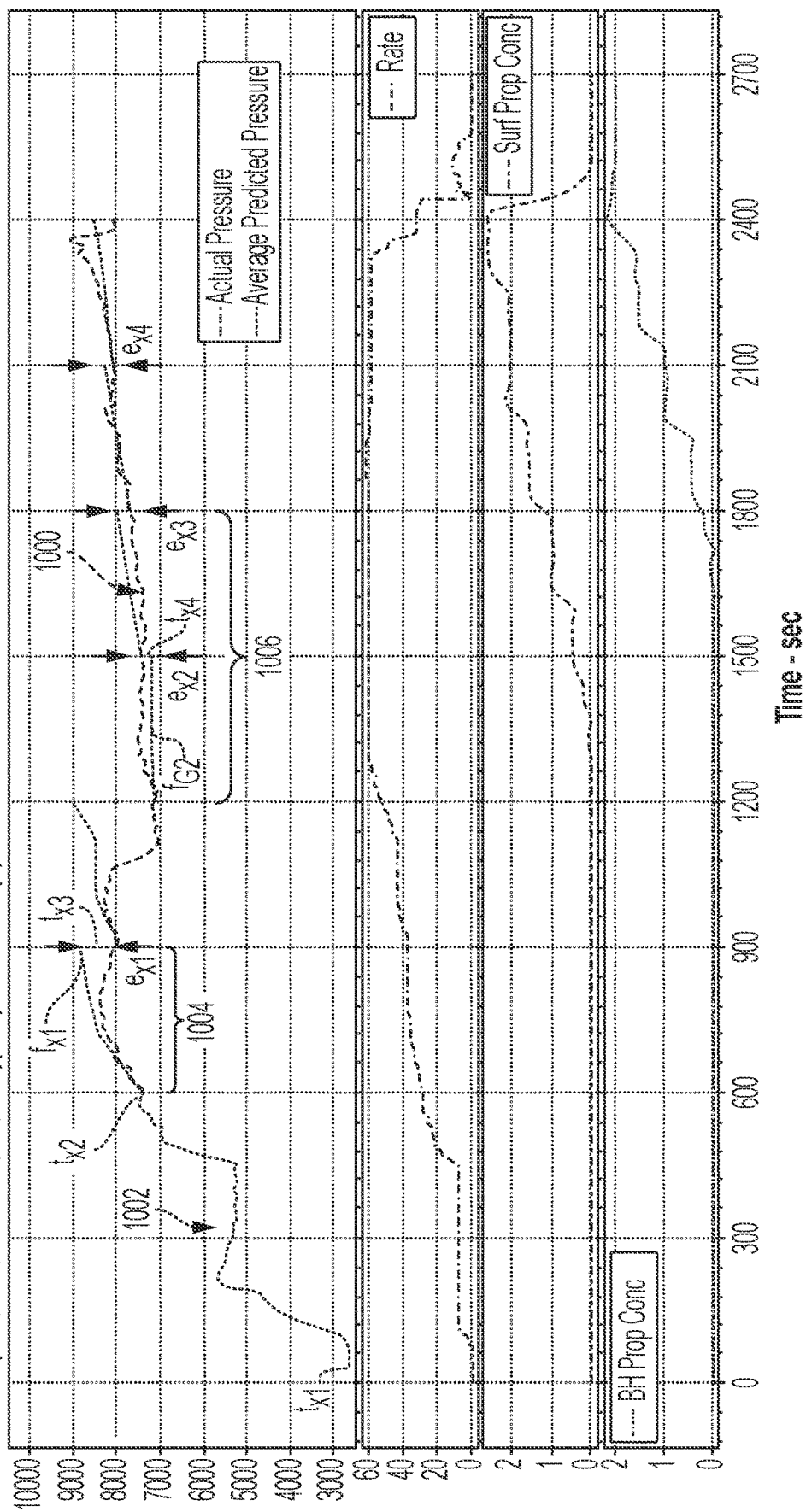

FIGS. 8, 9 and 10 are charts showing real-time history matching of observed actual fracture treatment pressure compared to model forecast values for the same parameter calculated purely based upon a purely statistical model. The calculations presented below show that the purely statistical models are flawed, particularly in the early stages of treating a well, and highly dependent on tuning of continuous hyperparameters to achieve moderately accurate results.

Example 1

The statistical pressure forecasts shown in FIG. 8 were obtained by use of a Multilayer Perception (MLP) algorithm that was trained in real time using bottomhole pressure data, together with fracture fluid pump rate, surface proppant concentration, and bottom hole proppant concentration over time at a well as a hydraulic fracturing operation was underway. This surface pressure data is back-calculated to establish a bottom hole pressure using Fracpro®. The bottomhole pressure is shown as a dashed line 800, whereas the statistical forecast values have smaller dashes as in line 802. The curves 800, 802 overlay one another in a first interval between times $t_1$ and $t_2$. In this first interval, the MLP algorithm is receiving surface pressure data from an actual well that is undergoing a hydraulic fracturing operation. At $t_2$, the model is inverted for use as a predictive or forecasting tool, which results in forecast $f_1$ extending over a second interval from $t_2$ to $t_3$. A separation distance $e_1$ demonstrates the magnitude error between the forecast $f_1$ and the actual surface pressure shown in interval 804. The surface pressure over interval 804 is added to the training data set for the MLP algorithm and the model is once again inverted at $t_3$, resulting in forecast $f_2$ out to time $t_4$, which is associated with error $e_2$ over interval 806. The process is repeated and each time results in errors $e_{m3}$ and $e_{m4}$ of diminishing magnitude over time.

Example 2

The statistical pressure forecasts shown in FIG. 9 were obtained by use of a Gated Recurrent Unit (GRU) algorithm that was trained in real time using bottomhole pressure which was back-calculated from observed wellhead surface pressure data, together with fracture fluid pump rate, surface proppant concentration, and bottom hole proppant concentration over time—all at a well as a hydraulic fracturing operation was underway. The observed pressure is shown as a dashed line 900, whereas the statistical forecast values have smaller dashes in line 902. The lines 900, 902 overlay one another in a first interval between times $t_{G1}$ and $t_{G2}$. In this first interval, the GRU algorithm is receiving bottomhole pressure data from an actual well that is undergoing a hydraulic fracturing operation. At $t_{G2}$, the model is inverted for use as a predictive or forecasting tool, which results in forecast $f_{G1}$ extending over a second interval 904 from $t_{G2}$ to $t_{G3}$. A separation distance $e_{G1}$ demonstrates the magnitude error between the forecast $f_{G1}$ and the actual surface pressure shown in interval 904. The surface pressure over interval 904 is added to the training data set for the GRU algorithm and the model is once again inverted at $t_{G3}$, resulting in forecast $f_{G2}$ out to time $t_{G4}$, which is associated with error $e_{G2}$ over interval 906. The process is repeated, resulting in error $e_{G3}$ of diminishing magnitude over time.

Example 3

The statistical pressure forecasts shown in FIG. 10 were obtained by use of an Extreme Gradient Boosting (XGB) algorithm that was trained in real time using bottomhole pressure that was back-calculated from observed wellhead surface pressure data, together with fracture fluid pump rate, surface proppant concentration, and bottom hole proppant concentration over time at a well as a hydraulic fracturing operation was underway. The observed pressure is shown as a dashed line 1000, whereas the statistical forecast values have smaller dashes as in section 1002. The curves 1000, 1002 overlay one another in a first interval between times $t_{X1}$ and $t_{X2}$. In this first interval, the XGB algorithm is receiving surface pressure data from an actual well that is undergoing a hydraulic fracturing operation. At $t_{X2}$, the model is inverted for use as a predictive or forecasting tool, which results in forecast $f_{X1}$ extending over a second interval from $t_{X2}$ to $t_{X3}$. A separation distance $e_{X1}$ demonstrates the magnitude error between the forecast $f_{X1}$ and the actual surface pressure shown in interval 1004. The surface pressure over interval 1004 is added to the training data set for the XGB algorithm and the model is once again inverted at $t_{X3}$, resulting in forecast $f_{X2}$ out to time $t_{X4}$, which is associated with error $e_{X2}$ over interval 1006. The process is repeated, resulting in errors $e_{X3}$ and $e_{X4}$ of diminishing magnitude over time.

MLP, GRU and XGB algorithms form the basis of machine learning or artificial intelligence, which is initially associated with significant error, but improves with time. These algorithms are also insensitive to multiple variables which are known from physics-based models to affect the pressure forecast and which may materially change over time. A process of statistical normalization, as described below, may be utilized to mitigate these errors.

Characterization of a Hybrid Model

Physics-based pressure forecasting models are available on commercial order and include, for example, Fracpro®, one example of a commercially available lumped 3D fracture model as discussed above. These models are extremely useful in forecasting pressure to improve the efficiency and safety of hydraulic fracturing operations. It is even possible to plot observed pressures in real time with the forecasts derived from such models while pumping is underway; however, the observed pressures do not always closely match the pressure forecasts. Moreover, as shown in the working examples above, the purely statistical models of real time performance may themselves deviate from the observed pressures. These deviations or errors may be very large in some cases. Thus, both the purely statistical models and the purely physics-based models are associated with interpretive problems when used to prevent problems, such as screen-outs, which may cause long delays and are expensive to fix. A "screen-out" occurs when proppant that is entrained in a frac fluid is unable to pass into developing fractures during the course of a hydraulic fracturing operation, typically at perforations through downhole casing. The proppant, usually sand, impedes flow of the frac fluid such that pressures may quickly rise to unsafe levels. The operation may need to shut down to clean out the hole.

The hybrid model described herein advantageously utilizes features of both a physical model and a statistical model to improve pressure tracking performance as a hydraulic fracturing operation is underway. The improved tracking performance may be used by a frac operator, for example, as an indicator that a screen-out is forthcoming so that the frac operator can either increase rate or decrease proppant concentration. If a rate increase is possibly warranted, then the improved tracking information may better inform the frac operator whether an increased pumping rate will create an unsafe condition by exceeding pressure safety parameters that govern the pumping operation.

In one aspect, physics-based rules for pressure forecasting may include a variety of additive pressure subcomponents according to equations (1) and (2) below:

$$p_{bottomhole} = \sigma_{closure} + p_{net} + p_{nwb\ friction} + p_{perf\ friction} \quad (1)$$

$$p_{surface} = p_{bottomhole} - p_{hydrostatic} + p_{well\ friction} \quad (2)$$

where $p_{bottomhole}$ is the dynamic bottomhole pressure of a well during a hydraulic fracturing operation; $\sigma_{closure}$ is the fracture closure pressure, $p_{net}$ is a net pressure difference between current bottomhole pressure and $\sigma_{closure}$; $p_{nwb\ friction}$ is pressure that is lost to friction in the geologic strata near the wellbore as pumping is underway, $p_{perf\,friction}$ is pressure that is lost to friction as the frac fluid exits the wellbore through perforations in casing, $p_{surface}$ is the observed surface pressure at the wellhead, $p_{hydrostatic}$ is the pressure at depth of a column of frac fluid including entrained proppant, and $p_{well\,friction}$ is pressure that is lost to fluidic friction in the wellbore as pumping is underway.

These values are obtainable from various sources on a case-by-case basis depending upon what data is available in the field for use on a particular well. The data of Ensemble A, described below, is preferred because it is most often available. By way of example, $p_{bottomhole}$, is equivalent to Btmh Pressure as calculated by Fracpro® and may be utilized when the frac operator has a reliable model for $\sigma_{closure}$ and $p_{net}$ as may be obtained from conventional DFIT or step down tests using methodology known to the art. In general, frac operators frequently do not have this information available, especially for a typical shale-well. For example, the frac operator may only have direct measurements encompassing $p_{nwb\,friction}$ and $p_{perf\,friction}$ from a stepdown test. Even this may not be available for a particular well.

Those skilled in the art will appreciate that physical-based models may use additional pressure loss subcomponents that are not represented in Equations (1) and (2), but data for these additional pressure loss subcomponents is most often lacking in the field. Thus, Equations (1) and (2) teach by way of example and may be amended within the level of ordinary skill for use when additional data is available.

A hybrid model according to the presently disclosed instrumentalities utilizes physics-based parameters for each of the pressure drop subcomponents identified in Equations (1) and (2), which are normalized by a process of statistical analysis leading to the determination of multipliers Mi. By way of example, the Mi multiplier may be any one of $M_{net}$, $M_{nwb,Q}$, $M_{nwb,C}$, $M_{perf,Q}$, $M_{friction,Q}$, and $M_{friction,C}$ in Equations (3) and (4) below.

$$p_{bottomhole} = \sigma_{closure} + M_{net} p_{net,DFIT} \left(\frac{Q_{forecast}}{Q_{DFIT}}\right)^{\beta net} + \quad (3)$$

$$M_{nwb,Q} k_{nwb} Q^{\beta nwb} + M_{nwb,C} C_{BHprop} + M_{perf,Q} k_{perf} Q^{\beta perf}$$

$$p_{surface} = p_{bottomhole} - \int_{surface}^{bottomhole} \rho_z g\, dz + \quad (4)$$

$$\Sigma_{segment1}^i p_{Fracpro,wellfriction,Q,C} M_{friction,Q} M_{friction,C}$$

where $M_{net}$ is a multiplier used to assess net pressure; $p_{net,DFIT}$ is net pressure (pressure in excess of $\sigma_{closure}$ holding the fractures open) obtained from a diagnostic fracture injection test or DFIT; $Q_{forecast}$ is a design rate of fluid flow from a lumped 3D fracture model; $Q_{DFIT}$ is the flowrate used in a DFIT to assess $p_{net}$, $M_{nwb,Q}$ is a multiplier used to assess near wellbore pressure losses that are sensitive to Q; Q is flowrate of injected frac fluid including proppant; $k_{nwb}$ is a multiplier relating near-wellbore friction to rate near the wellbore; $M_{nwb,C}$ is a multiplier used to estimate near wellbore pressure as a function of bottomhole proppant concentration, $C_{BHprop}$ is bottomhole proppant concentration, $M_{perf,Q}$ is a multiplier used to estimate pressure loss due to flowing frac fluid at flowrate Q; $K_{perf}$ is a multiplier relating perforation friction to flowrate through the perforations; $p_z$ is pressure at a depth Z; g is a gravitational constant; $p_{Fracpro,well\,friction,Q,C}$ is frictional pressure loss calculated from a lumped 3D fracture model when flowing frac fluid including proppant at a rate Q with bottomhole proppant concentration C; $M_{friction,Q}$ is a multiplier used to assess pressure losses due to wellbore friction at flowrate Q; $M_{friction,C}$ is a multiplier used to assess pressure losses due to wellbore friction at bottomhole proppant concentration C; $\beta_{net}$ is a rate sensitive power factor for calculating $p_{net}$ that is usually ¼ in normal wellbores; $\beta_{nwb}$ is a power factor for calculating near wellbore pressure losses that is usually ½ in normal wellbores, and $R_{perf}$ is a power factor that is used for calculating pressure drop through the perforations and is usually 2 in normal wellbores.

As used herein, the term "pressure loss subcomponent" means, by way of example, values that are separated by the additional sign "+" in any of Equations (1) through (4).

Data according to several terms defined above is specifically obtained from DFIT testing. If DFIT data is unavailable, data obtainable from stepdown tests may be substituted according to the discussion below. Analysis of DFIT and stepdown data is commonly done in the art, and the discussion of these values is well within the understanding of the level of ordinary skill. For articles teaching about the determination and use of this data, see References 13-16 in the References section below.

Altogether, Equations (3) and (4) provide a total of six 6 statistics-based multipliers, i.e., $M_{net}$, $M_{nwb,Q}$, $M_{nwb,C}$, $M_{perf,Q}$, $M_{friction,Q}$, and $M_{friction,C}$ (generically $M_i$). These multipliers may be estimated, for example, on a pressure subcomponent by subcomponent basis as explained below and used in a hybrid model to forecast pressures.

Equations (3) and (4) are the hybrid model counterparts of Equations (1) and (2). Each of the pressure loss subcomponents in Equations (1) and (2) has a functionally equivalent or analogous pressure loss subcomponent that is found comparatively in Equations (3) and (4). By way of example, consider that all such equations define pressure drops as a combination of additive pressure loss subcomponents, each providing pressure losses in association with what may be the very same physics-based relationships, except that in the hybrid model the use of statistically-based multipliers $M_i$ normalizes the calculations for purposes of improving pressure forecasts to mitigate screen-outs. By way of example, Equation (5) below presents equivalent relationships linking the $p_{net}$ subcomponent of pressure drop from the purely physical model of Equation (1), as compared to the analogous subcomponent of Equation (3):

$$p_{net} = f(Q) = p_{net,DFIT}\left(\frac{Q_{forecast}}{Q_{DFIT}}\right)^{1/4} \approx M_{net} p_{net,DFIT} \left(\frac{Q_{forecast}}{Q_{DFIT}}\right)^{1/4} \quad (5)$$

where $p_{net}$ is net pressure as applied to opening a fracture; f(Q) designates a function of flowrate Q and is not exclusively the only way to calculate $p_{net}$ known to the art. The term.

$$p_{net,DFIT}\left(\frac{Q_{forecast}}{Q_{DFIT}}\right)^{1/4} \quad (6)$$

is one way of providing f(Q) in a purely physical model as is known to the art and may be substituted by another variant of the more generalized f(Q). The term $$M_{net} p_{net,DFIT}\left(\frac{Q_{forecast}}{Q_{DFIT}}\right)^{1/4} \quad (7)$$

utilizes a statistically-derived multiplier $M_{net}$ that smooths error which may arise due to faulty data inputs into the physical models and so also provides a better indicator of an impending screen-out. The faulty data inputs may arise, for example, due to assumptions or approximations made in cases where the frac operators lack actual data from a particular well or from tests, such as DFIT and step-down test that are improperly performed or are performed with faulty equipment.

Table 1 below presents variables, grouped in various ensembles, which may be mapped to flowrate (Q) using multivariate analysis to determine the parameters of a multivariate analysis.

TABLE 1

Variables for multivariate analysis of time-based arrays

| Ensemble | Variable | Description |
|---|---|---|
| A | $P_{bottomhole}$ Q $C_{Surf}$, $C_{BH}$, P, and FR. | Defined above |
| B | Variables from ensemble A plus $P_{surface}$ | Defined above |
| C | Variables from ensemble A or B plus μ | μ is frac fluid liquid phase viscosity |
| D | Variables from ensemble A, B or C plus $ρ_s$ | $ρ_s$ is frac fluid (slurry) density. |
| E | In any combination, $P_{net}$, $P_{entry\,friction}$, $Q_s$, $P_{perf\,frictionQ,C}$, $P_{nwbfrictionQ,C}$, plus any of ensembles A, B, C, or D | Terms are defined below |
| F | $σ_{closure}$, $K_{perf}$, $K_{nwb}$ plus any of ensembles A, B, C, D or E | These values, defined above are normally held constant for use in training the multivariate model; however, this is an expedient because the values may vary with time, but the data needed to calculate these values is almost never available in the field. One benefit of the process of statistical normalization is to smooth the data for these unknown effects. |
| G | $P_{bottomhole}$, $P_{surface}$, Q | Variables are defined above. |

The various ensembles of Table 1 are used to develop a mathematically based relationship that maps flowrate to pressure. This may be, for example, a neural network or a linear regression. A training data set may include, by way of example, the time based arrays of Ensemble A described above. This data is input to a statistical software package such as Simulink® and Matlab®, SAS™, StatSim or R, which creates a mapping algorithm, such as a multivariate regression. The multivariate regression maps frac fluid flowrate (Q) to a forecast surface or bottomhole pressure. More generally, the algorithm may also map pressure loss subcomponents under study, such as the pressure loss subcomponents set forth in Equations (10)-(20) below. In a multi-stage frac job, the best training data set for a selected frac stage may be, for example, a historical data set that is obtained from the preceding stages of the same overall frac operation. It is also possible to utilize historical data from the same stage of a hydraulic fracturing operation that is presently underway as the multivariate analysis is being performed, with the historical data set being continuously updated as the hydraulic fracturing operation proceeds.

Figure 13:
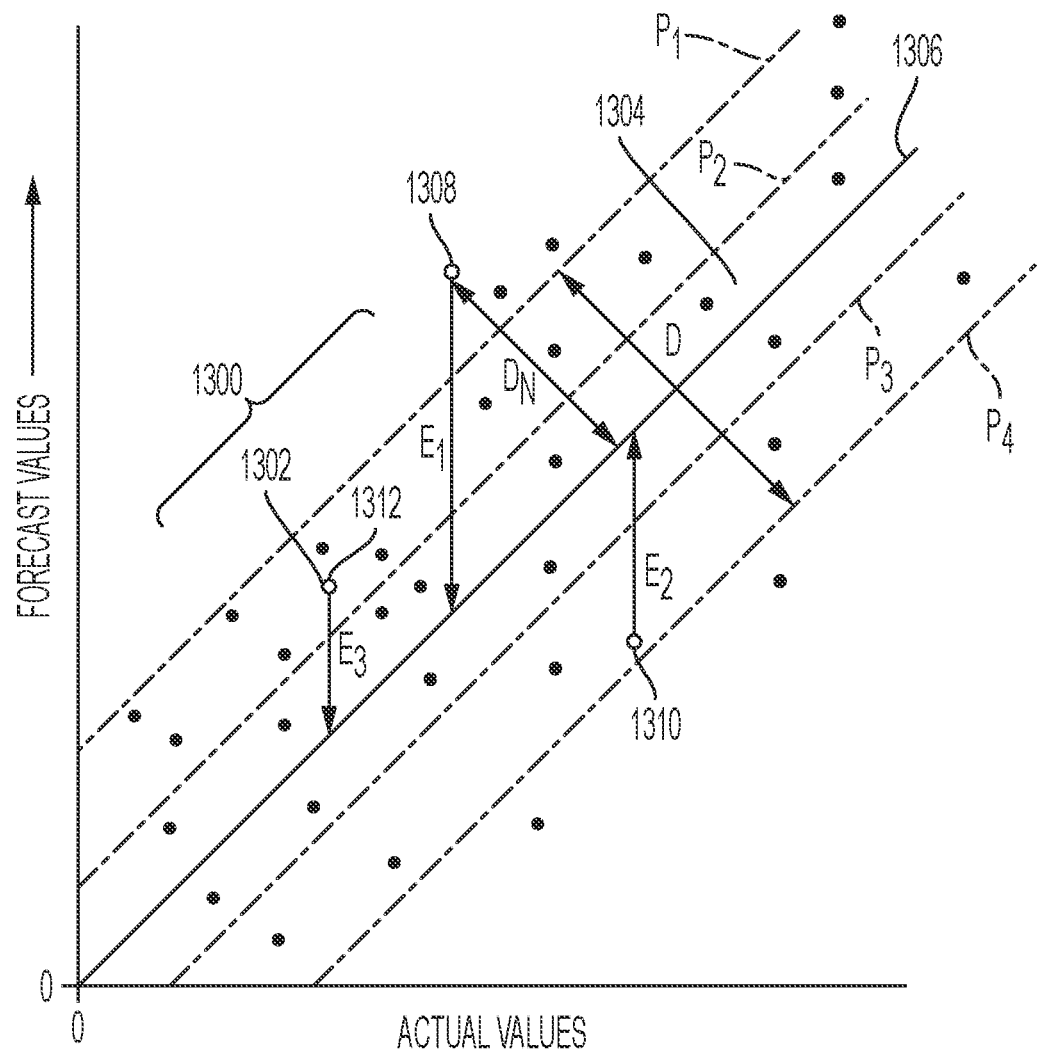
FIG. 13 illustrates a linear regression technique that may be used according to one embodiment to determine multipliers for mitigating error through the use of multipliers in a hybrid pressure forecasting model.

The forecast pressures from the multivariate model thus obtained are improved by a process of statistical normalization to mitigate error in the pressure forecast. FIG. 13 shows the process of statistical normalization according to one embodiment. A dataset 1300 is represented by plotting datapoints, such as datapoints 1302, 1304, that have been algebraically isolated to encompass a single pressure loss subcomponent as defined above.

To obtain these datapoints, Equations (3) and (4) are algebraically manipulated for a solution defining a selected pressure loss subcomponent on one side of the manipulated equation at the forecast rate. With all other variables from the training data set being held constant at the forecast rate and the multipliers ($M_i$) given a value of "1,", this permits entry of a forecast rate Q to calculate an "actual" value ($P_{actual}$) for the pressure loss subcomponent. The same calculation may be repeated utilizing the same flowrate Q, but substituting a forecast pressure obtained from the multivariate relationship where the forecast pressure ($P_{forecast}$) has not yet been normalized. The value $P_{forecast}$ differs from $P_{actual}$, resulting in the scatter of dataset 1300.

As shown in FIG. 13, the $P_{actual}$ values are plotted along the X-axis and the forecast values ($P_{forecast}$) along the Y axis. The dataset 1300 is submitted to regression analysis to provide a curve or line 1306 providing a best fit through the dataset 1300 on the basis of minimizing deviations from the line 1306. The line 1306, for example, may be calculated as a first order least squares fit of the dataset 1300 that is anchored at a point of origin (0,0). If the line 1306 is, alternatively, not anchored at the point of origin, then for example each of Equations (10) to (20) may require the addition of a constant $C_i$ of a magnitude where the line 1306 intersects the X-axis (not shown) for use in the $i^{th}$ pressure loss subcomponent.

Iso-probability lines $Pr_1$, $Pr_2$, $Pr_3$, $Pr_4$, etc. . . . represent a probabilistic distribution running perpendicularly to line 1306 where such distributions may be, for example, binomial, triangular, or Gaussian, as best represents the distribution across line 1306. The line 1306 forms the mode of any such distribution. Using the line 1306 as a mode facilitates solutions of statistical equations known to those of ordinary skill in the art such that the iso-probability lines run in parallel to line 1306. In practice it will seldom if ever be necessary to use anything other than a Gaussian distribution, which is well known. The dataset 1300 is formed of ($P_{actual}$, $P_{forecast}$) datapoints 1302, 1304, 1308, 1312, uncorrected by the use of any multipliers.

Any given one of the data points, such as data points 1302, 1308, 1312, respectively deviate from the line 1306 by vertical separation differences $E_1$, $E_2$, $E_3$. The aforementioned multipliers $M_{net}$, $M_{nwb,Q}$, $M_{nwb,C}$, $M_{perf,Q}$, $M_{friction,Q}$, $M_{friction,C}$, and $M_{entry}$ (generically Mi) may each be calculated as a means of normalization to offset or mitigate the differences $E_1$, $E_2$, $E_3$. The simplest way to do this is as a straight ratio, as provided in Equation (8) below where for a given flowrate Q that is a design rate for the well under study:

$$M_i = P_{1306}/P_{forecast} \quad (8)$$

where $P_{1306}$ is the pressure value from line 1306 at flowrate Q and $P_{forecast}$ is the non-normalized forecast pressure at the flowrate Q. The multiplier Mi may be any of $M_{net}$, $M_{nwb,Q}$, $M_{nwb,C}$, $M_{perf,Q}$, $M_{friction,Q}$, and $M_{friction,C}$.

This may be modified by the use of Equation (9) below to assess the value $P_{1306}$ as the nearest normal (perpendicular) distance $D_N$ to the line 1306.

$$D_N = \left[\left(\frac{P_{forecast} - mP_{actual}}{2m}\right)^2 + \left(\frac{mP_{actual} - P_{forecast}}{2}\right)^2\right]^{1/2} \quad (9)$$

where $P_{actual}$ is an actual pressure associated with the forecast pressure $P_{forecast}$, and m is the slope of line 1306.

The ensembles of Table 1 are non-limiting. Regardless of the ensemble designation, any of the variables may be used in any combination. It is preferred to utilize fluid injection flowrate (Q) plus at least one of $P_{bottomhole}$ and/or $P_{surface}$. The variables of ensemble A are particularly preferred and may be used in any combination such as Q plus any additional one, two, three, four or five of the variables of Ensemble A. These combinations may be supplemented by the variables of ensembles B through G in any combination.

The following discussion provides specific examples of where to obtain data for the various pressure drop subcomponents of Equations (3) and (4).

A. What to assume for regressing the multipliers touching upon $p_{net}$ and $\sigma_{closure}$.
  a. When DFIT data is available.
  Use $p_{net}$ net pressure observed from a DFIT on the well at issue or estimated from nearby DFITs. $p_{net}$ is proportional to $Q^{1/4}$, which is a common proportionality between pressure and rate in simple (radial) frac models. Using DFIT-based values:

$$p_{net,EOJ} = ISIP - \sigma_{closure} \quad (10)$$

$$p_{net,forecast} = M_{net} p_{net,DFIT} \left(\frac{Q_{forecast}}{Q_{DFIT}}\right)^{1/4} \quad (11)$$

where $p_{net,EOJ}$ is net pressure at the end of the DFIT; ISIP is an initial shut-in pressure from a DFIT or stepdown test; $p_{net,forecast}$ is forecast net pressure; $Q_{forecast}$ is forecast injection flowrate, and $Q_{DFIT}$ is the injection flowrate associated with a DFIT-based $p_{net}$ determination. As an example, if $p_{net}$ is 500 psi based on a DFIT rate of 5 bpm, $p_{net}$ during the forecasted job at say 60 bpm would be 930 psi. $\sigma_{closure}$ may be estimated from an actual DFIT or maps of DFIT results from nearby analogous wells. Once determined, the value for $\sigma_{closure}$ may be kept fixed throughout the job as an estimate, although the actual value may change as a result of pumping hysteresis.
  b. When there is no DFIT data.

$$p_{net,forecast} + \sigma_{closure} = BH\ ISIP \quad (12)$$

where BHISIP is bottomhole initial shut-in pressure obtained from a stepdown test in the well of interest or from nearby wells, or as an average pressure from a stepdown test. Frac operators commonly track ISIP data from nearby wells. Alternatively, it is possible to do a regression that calculates the multiplier with data obtained from all ISIPs observed in nearby wells including also a rate-sensitivity of past frac jobs. This facilitates a separation of the rate-sensitive $p_{net}$ and the fixed $\sigma_{closure}$. One way of doing this for a particular well, as is known in the art, is to plot BHISIP vs log rate and extrapolating $\sigma_{closure}$ to a zero rate assuming $Q^{1/4}$ sensitivity.

What to assume when calculating $p_{hydrostatic}$.
For this parameter, calculated values from a lumped 3D fracture model may be calculated as: bottomhole $$\Delta p_{hydrostatic} = \int_{surface}^{bottomhole} \rho_z g\, dz \quad (13)$$

In the case of the Fracpro® model, this may be obtained directly as Fracpro's $p_{hydrostatic}$. The calculation as represented above is based on fluid and proppant density as specified in the Fracpro® Fluid and Proppant type, the Fracpro® Wellbore Trajectory and the Fracpro® Treatment Schedule.

What to assume when regressing multipliers for $p_{well\ friction}$.
Wellbore friction losses are a function of multiple variables including, among others, flowrate Q, fluid viscosity, proppant concentration and size distribution, and wellbore geometry such as number of perforations, perforation sizes, and tubing diameter. Lumped 3D fracture models routinely calculate wellbore friction losses, which vary by design from well to well. It is recommended to utilize commercial modeling software for these values. By way of examples, Fracpro® contains lookup tables listing values for wellbore friction in psi/bpm for different types of fluid in different pipe diameters. These tables are calculated by purely physical models using means well known to the art. Either Fracpro® or similarly derived tables may be used to determine $p_{well\ friction}$. In addition, the wellbore trajectory and tubular design may be subjected to having multiple fluids in the wellbore with different wellbore segments having different tubular diameters. The most prominent observations in wellbore friction occur when a new fluid enters the casing, or, even more noticeable when the casing or narrower liner narrows in diameter. In Fracpro®, by way of example, the model may be alternatively configured to assess these alternative forms of $P_{net}$:

$$p_{well\ friction} = \text{Wellbore friction rate}^{\sim 1.5}(\text{slope from friction lookup table}). \quad (14)$$

$$p_{wellfriction,Q} = \Sigma_{segment1}{}^i p_{Fracpro,wellfriction,Q} M_{friction} \quad (15)$$

$$p_{wellfriction,Q,C} = \Sigma_{segment1}{}^i p_{Fracpro,wellfriction,Q,C}\ M_{friction,Q} M_{friction,C} \quad (16)$$

where $p_{well\ friction}$ provides a pressure loss calculated from a purely physical relationship embodied in data found in lookup tables utilized by Fracpro®, $p_{well\ friction,\ Q}$ is a flowrate-dependent friction-based pressure loss determined apart from surface proppant concentration, $p_{well\ friction,\ Q,C}$ is a flowrate-dependent friction-based pressure loss determined including also the effect of surface proppant concentration, $M_{friction}$ is a statistical multiplier (a type of Mi as discussed above), $M_{friction,\ Q}$ is a flowrate-dependent statistical multiplier determined in tandem with $M_{friction,\ C}$ which is a co-multiplier used in tandem with $M_{friction,\ Q}$, segment 1 describes a first segment of i segments having different tubular diameters in the wellbore geometry, $p_{Fracpro,wellfriction,\ Q}$ is a well friction pressure drop determined from a lumped 3D fracture model without variance of surface proppant concentration, and $p_{Fracpro,wellfriction,\ Q}$ is a well friction pressure drop determined from a lumped 3D fracture model with variance of surface proppant concentration.

What to assume in regressing multipliers for $p_{nwb\ friction}$ and $p_{perf\ friction}$.
  a. When there is a stepdown test.
  Often in jobs, surface pressures rise in lockstep with increases in the downhole proppant concentration. This multiplier $M_{nwb,C}$ reflects how much the pressure increases with proppant concentration. It is perhaps common to see at least 100 psi/ppg in a typical frac job. This sensitivity is not reflected in normal (physics-based) friction models. This is why Equation (3) has the term set forth below. The multiplier $M_{nwb,Q}$, can be set to 1 to match the physics-based model estimates as are commonly obtained from lumped 3D fracture models.

$$p_{nwb\,friction,Q,C} = M_{nwb,Q} k_{nwb} Q^{1/2} + M_{nwb,C} C_{BHprop} \quad (17)$$

In addition, the first portion of the equation may be time-dependent, with a changing (often tightening) restriction at the near-wellbore during a frac job. The second term in this equation may also be dependent on proppant type. For example, smaller proppant (for example 100 mesh proppant) pumped early in the job might see a lower pressure restriction than courser proppant (for example 40/70 mesh proppant) pumped later during a typical shale frac job.

For regressing multipliers associated with perforation friction, it is possible to use the calculated perforation friction in a physics-based fracture model from a stepdown test. Equation (18) includes a rate-sensitive multiplier $M_{perf,Q}$. This multiplier may be set to 1 if $p_{perf}$ is used from a physics-based model, such as Fracpro. The physics-based model calculations already include changes in friction due to the slurry density as driven by proppant concentration changes:

$$p_{perf\,friction,Q,C} = M_{perf,Q} k_{perf} Q^2 \quad (18)$$

Perforation friction (e.g., $P_{perf\,friction,Q,C}$) may be calculated using a stepdown test. The physics-based model calculations already include changes in friction due to the slurry density as driven by proppant concentration changes. This facilitates the calculation of entry pressure as per Equation (19), which is a useful parameter for determining when a screen-out is underway $$p_{entry\,friction,Q} = p_{nwb\,friction,Q,C} + p_{perf\,friction,Q,C} \quad (19)$$

where $P_{entry\,friction,Q}$ is a rate-sensitive and proppant concentration-sensitive component of frictional pressure loss in the near wellbore and perforations connoting the pressure required for frac fluid to enter a fracture through the wellbore perforations.

(a) When there is no stepdown test data on a well of interest:

Regardless of the availability of a stepdown test, frac companies will benefit from maintaining a library of pumping pressure just before the ISIP ($PP_{ISIP}$) and ISIP or $P_{entry\,friction,\,Q}$. The difference between these two values is the total friction at the end of a job. Equation (20) immediately below provides a simple power-law model for that entry friction:

$$p_{entry\,friction,Q} = M_{entry}(p_{BH,Q} - ISIP_{BH})^{\beta_{entry}} \quad (20)$$

where $P_{entry\,friction,\,Q}$ is a bottomhole pressure loss due to entry of frac fluid into a fracture at a particular flowrate Q, $M_{entry}$ is a multiplier used to normalize $P_{entry\,friction,\,Q}$; $P_{BH,\,Q}$ is the bottomhole pressure at the particular flowrate Q; $ISIP_{BH}$ is the bottomhole initial shut-in pressure, and $\beta_{entry}$ is a power factor, typically ¼, ½, or 2.

It will be appreciated that, as to $P_{entry\,friction,\,Q}$, a data point 1308 (see FIG. 13) representing this value may fall outside of an iso-probability line, such as the iso-probability line $Pr_1$ may have statistical significance as an outlier identifying an impending screen-out. The iso-probability line $Pr_1$ may present, for example, a standard deviation from Gaussian distribution or an empirically derived threshold that is observed as a precondition of screen-out and may be uniquely associated with the geology of a particular producing basin. This type of outlier analysis may be used in combination with another threshold defined by an empirically determined ratio of slopes (see discussion of FIG. 12C below), also indicating an impending screen-out.

Working Example of a Hybrid Model

Example 1—Sunnyside State 2 B 2H-540 Stage 3 Frac

Data was compiled for use in a training set of data according to Ensemble A as described above, the data being taken from Stages 1 and 2 of the same well. Alternatively, the data set could have been taken analogous wells located in nearby proximity to the well of interest. A system of multipliers as created to provide values for $M_{net}$, $M_{nwb,Q}$, $M_{nwb,C}$, $M_{perf,Q}$, $M_{friction,Q}$, $M_{friction,C}$, and $M_{near}$, which were used to normalize of pressure values calculated by the multivariate model as described above in context of FIG. 13. The normalized pressure forecast values from the hybrid statistical model provided a real-time or near real-time analysis of pressure performance while a well located in the Permian Basin underwent a hydraulic fracturing operation. The resulting hybrid model included a first order multivariate regression mapping the variables of Ensemble A to bottomhole pressure, together with a system of multipliers M I used to normalize forecast pressures from the regression.

Figure 11A:
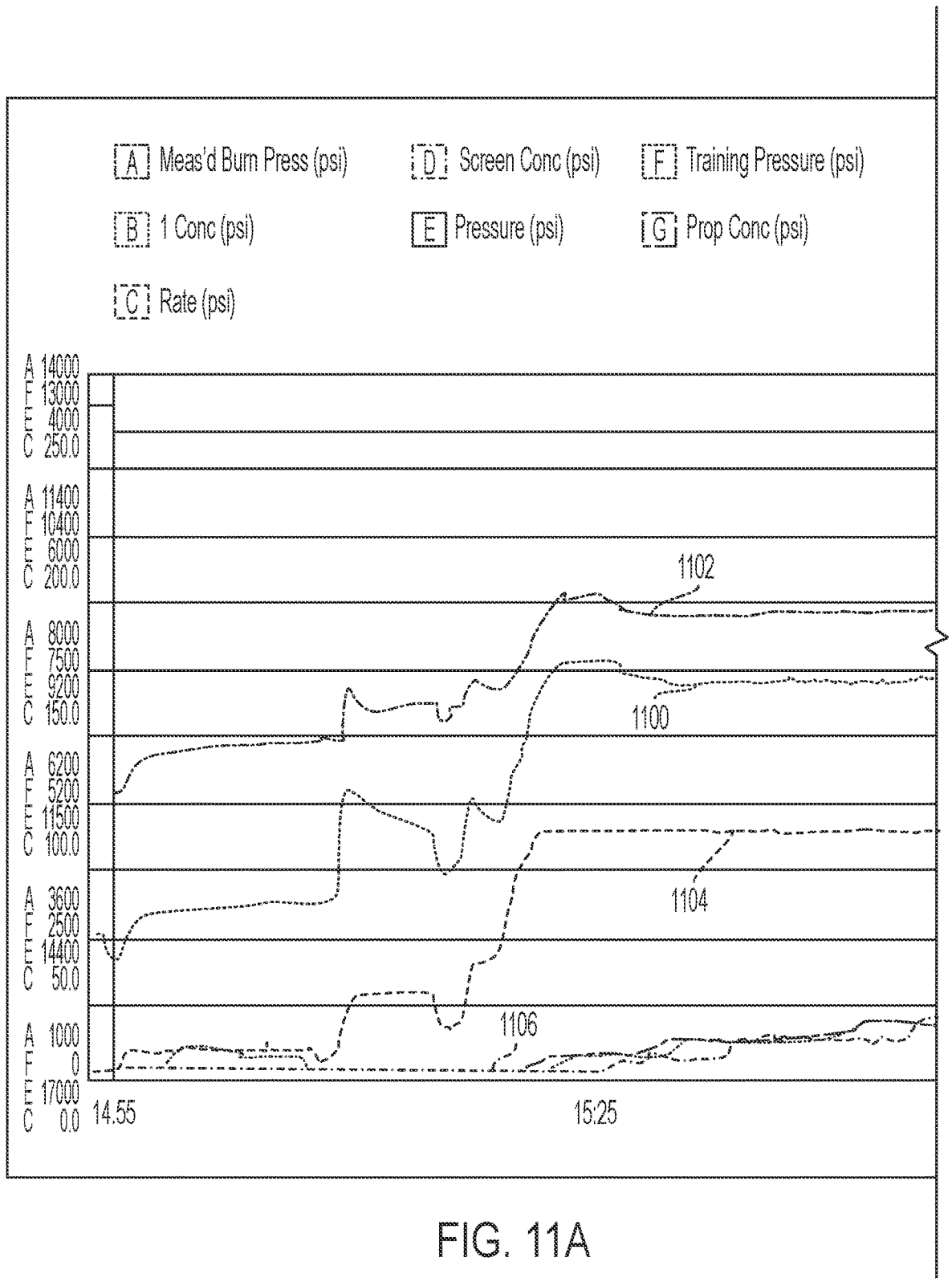
FIGS. 11A, 11B and 11C show fracture treatment data for the Sunnyside State 2 B 2H-540 well at fracture stage 3, the treatment resulting in an undesirable screen-out.
Figure 11B:
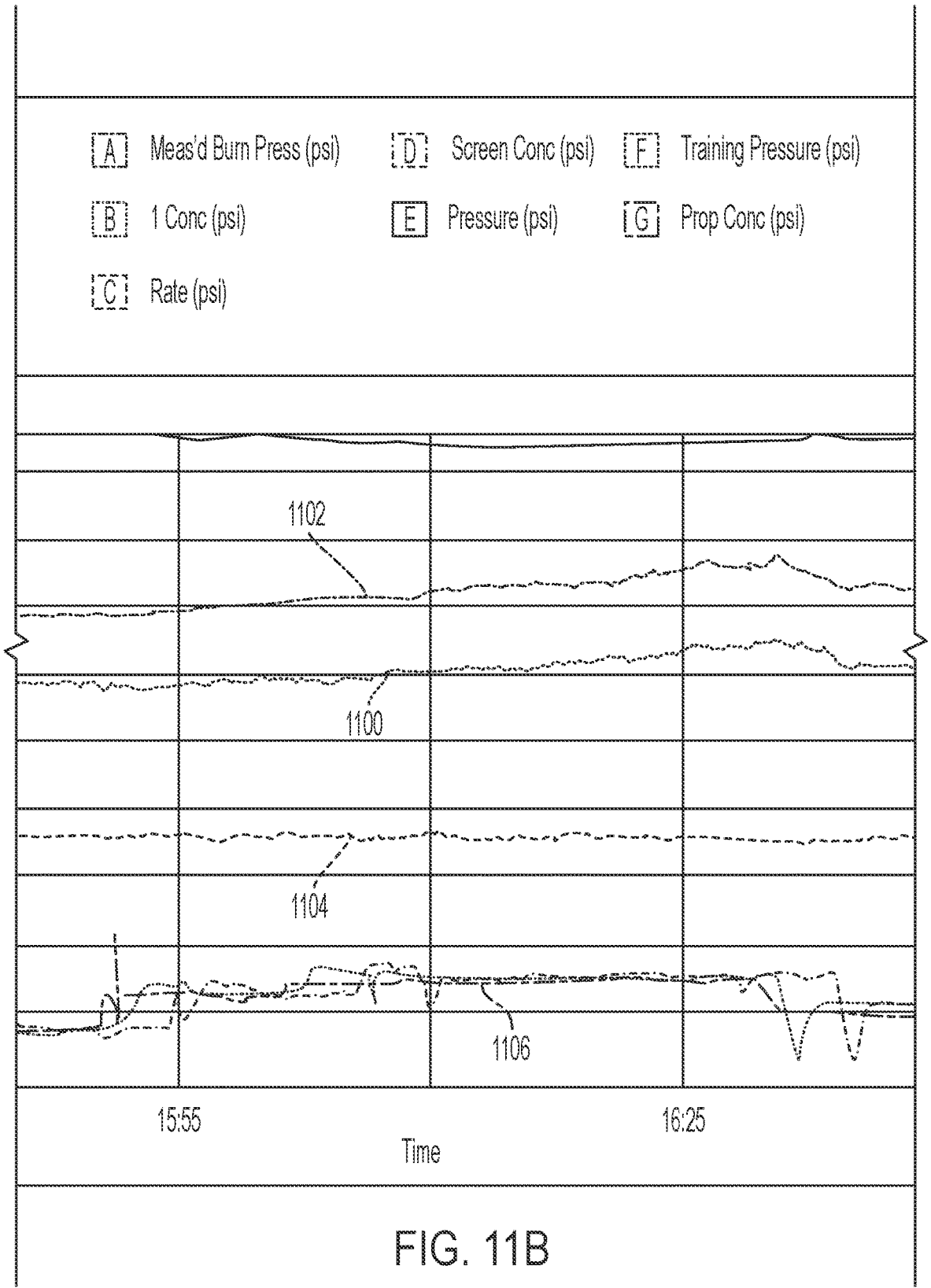
Figure 11C:
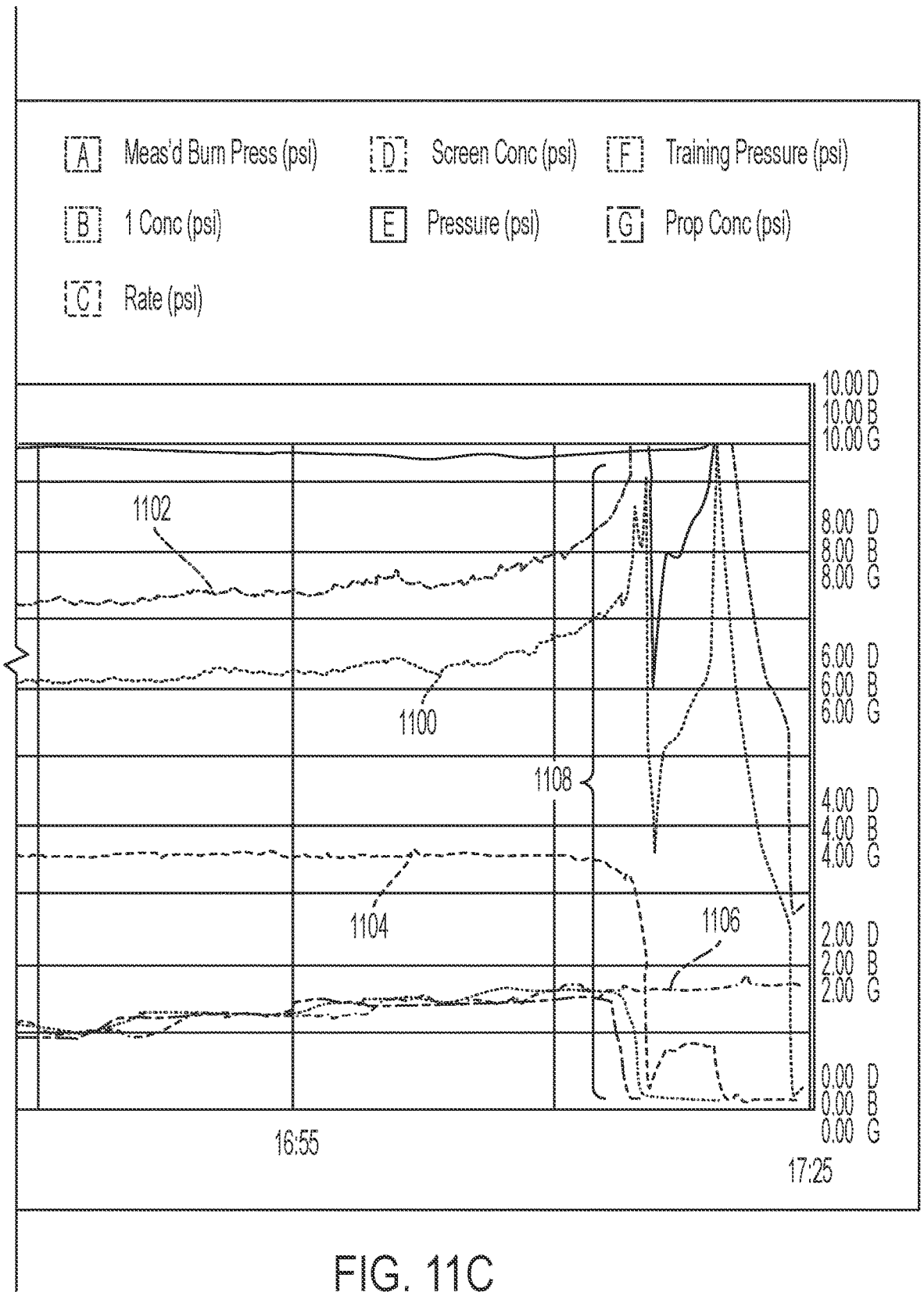

FIGS. 11A, 11B and 11C show the time-based fracture treatment data for this job. A progressively rising treating (surface psi) pressure 1100 and bottomhole pressure 1102 (psi) beginning at about 137 minutes (time of day 17:15 hours) forewarned of a screen-out 1108.

Figure 12A:
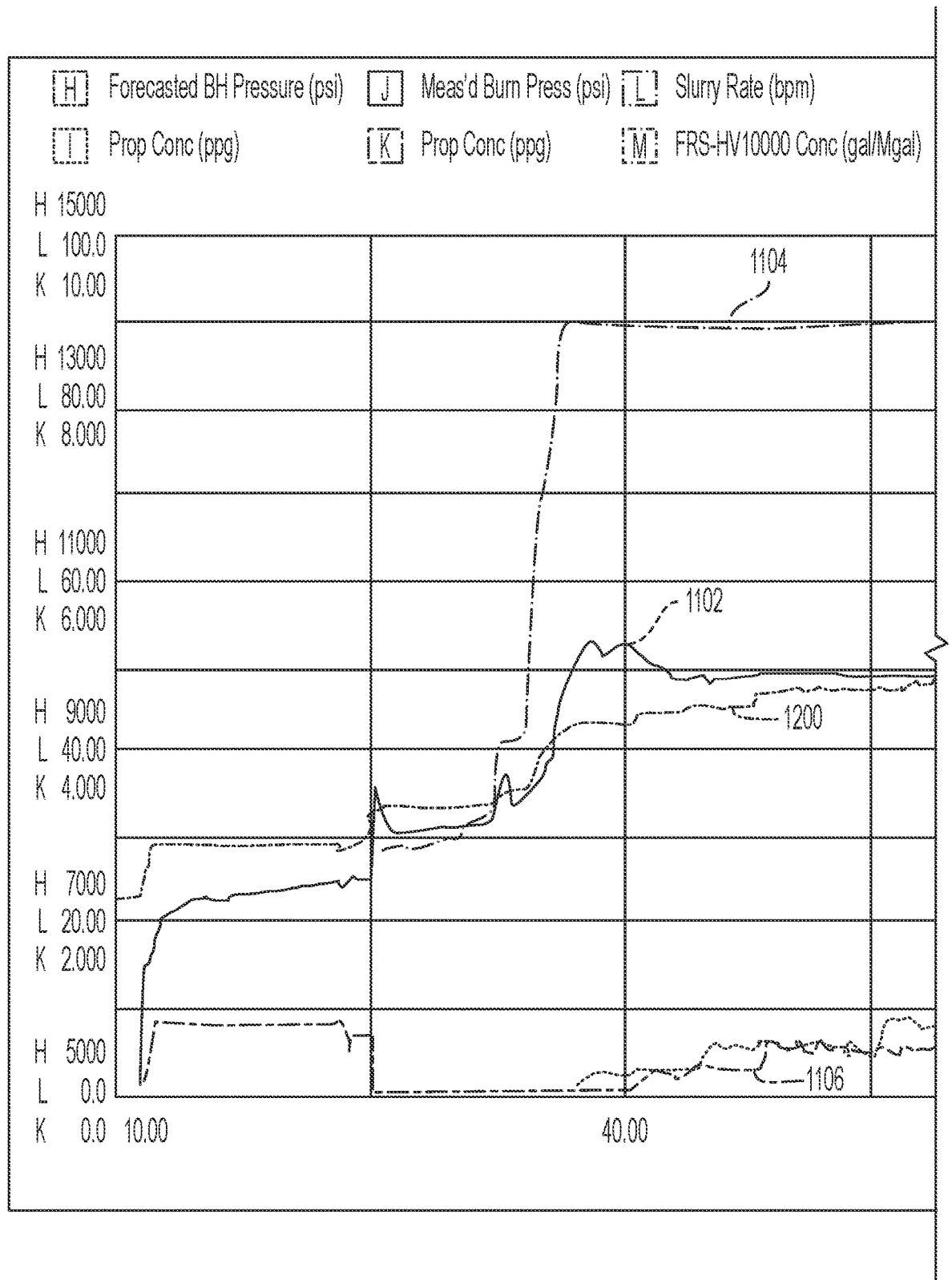
FIGS. 12A, 12B and 12C show the observed pressure data from the Sunnyside State 2 B 2H-540 well as compared to forecast pressures from the hybrid model to provide a useful forewarning of an impending screen-out.
Figure 12B:
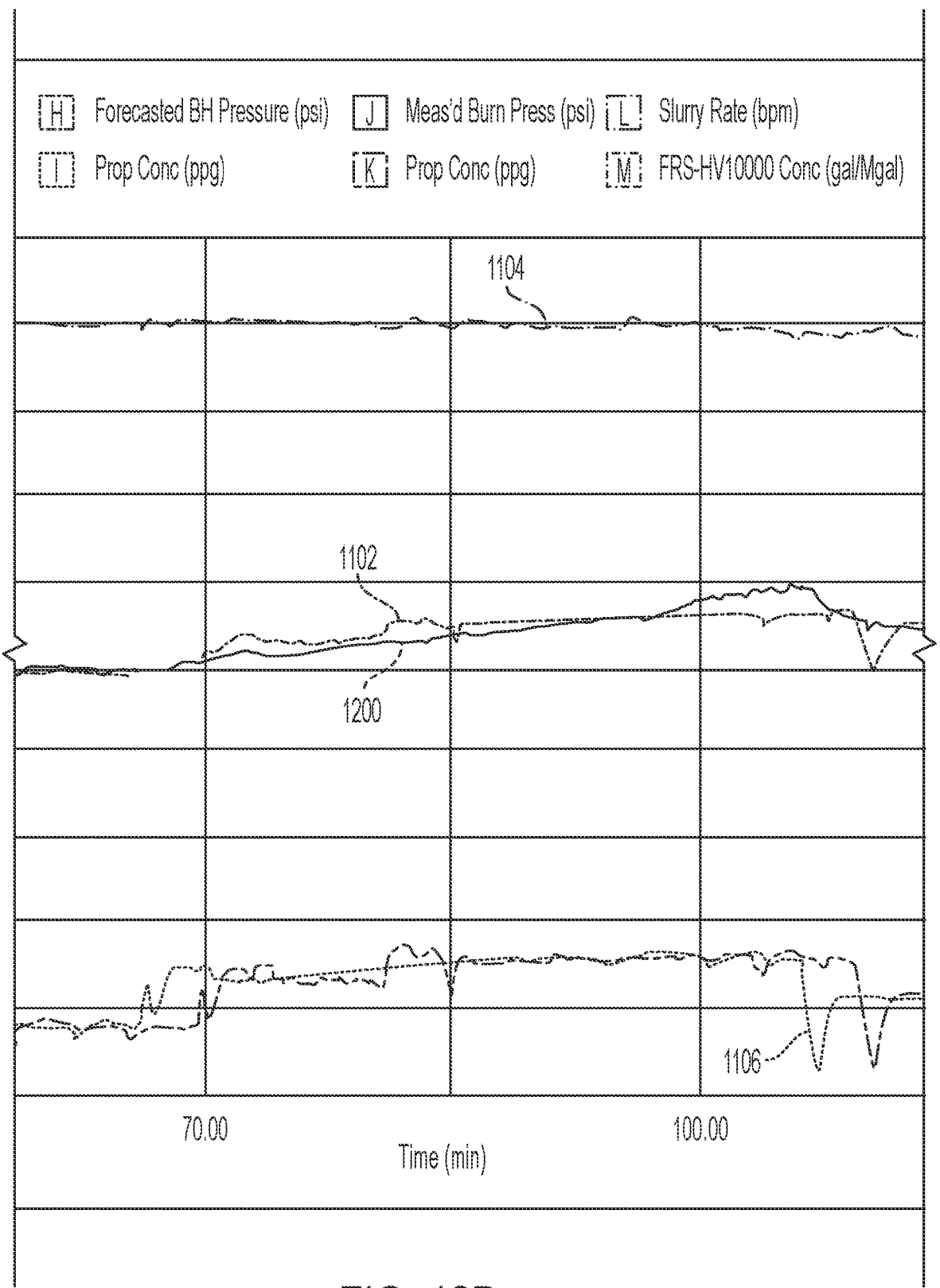
Figure 12C:
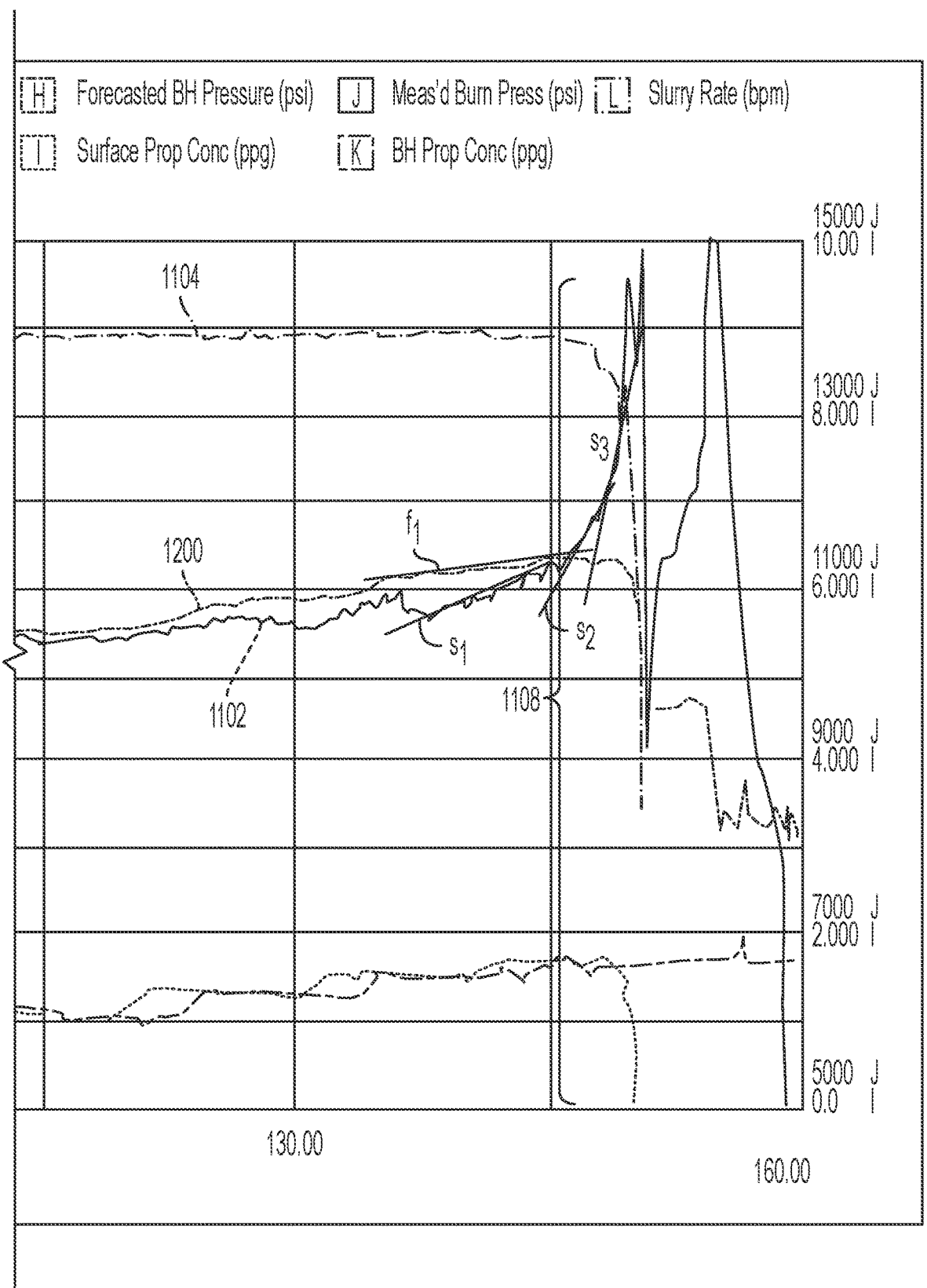

FIGS. 12A to 12C show data from the same hydraulic fracturing operation, although as compared to FIGS. 11A to 11C the X-axis has changed from time of day to minutes and the scale of the Y-axis values has also changed. In FIGS. 12A to 12C, a normalized pressure forecast 1200 is obtained from the aforementioned hybrid model including multipliers $M_L$ according to Equation (4).

It will be appreciated that a slope $F_1$ of the normalized pressure forecast 1200 is flat or even concave down while slopes $S_1$, $S_2$, $S_3$ of the observed bottomhole pressure 1102 are increasing and rapidly progress to concave up. In FIG. 12C, the change in slopes $S_1$ to S3, when compared as a ratio to the flatter performance of the forecast pressure slope $F_1$, connote a significantly increasing problem—that of a screen-out 1108 which is underway. This may be determined as an empirically determined threshold indicating impending trouble, such as 2× the slope F1, which the system may utilize to trigger an alarm to alert the frac operator.

A frac operator has at least three non-mutually exclusive remedial options to prevent or mitigate screen-out: (1) one is to dump friction reducer into the frac fluid in order to increase flowrates while maintaining safe pressures, (2) another is to increase flow rate by increasing pumping pressure while maintaining safe pressures; and (3) reduce the bottomhole proppant concentration by mixing less proppant into the frac fluid. Of these three options, only option (2) has immediate effect, but pumping pressure cannot always be safely increased. Options (1) and (2) require pumping a frac fluid slurry downhole, which takes time before the changed amount of friction reducer and proppant concentration have their intended effect. While not all screen-outs can be resolved while they are underway, it helps to have an increased lead time permitting these remedial measures to have their intended effect as they are pumped downhole.

As shown in FIG. 12C, an alert frac operator might have had abut fifteen minutes warning to act based upon the observed slope changes discussed above. This would have been sufficient time for the frac operator to take appropriate remedial action and for the remedial action to have most of its intended effect.

Figure 14:
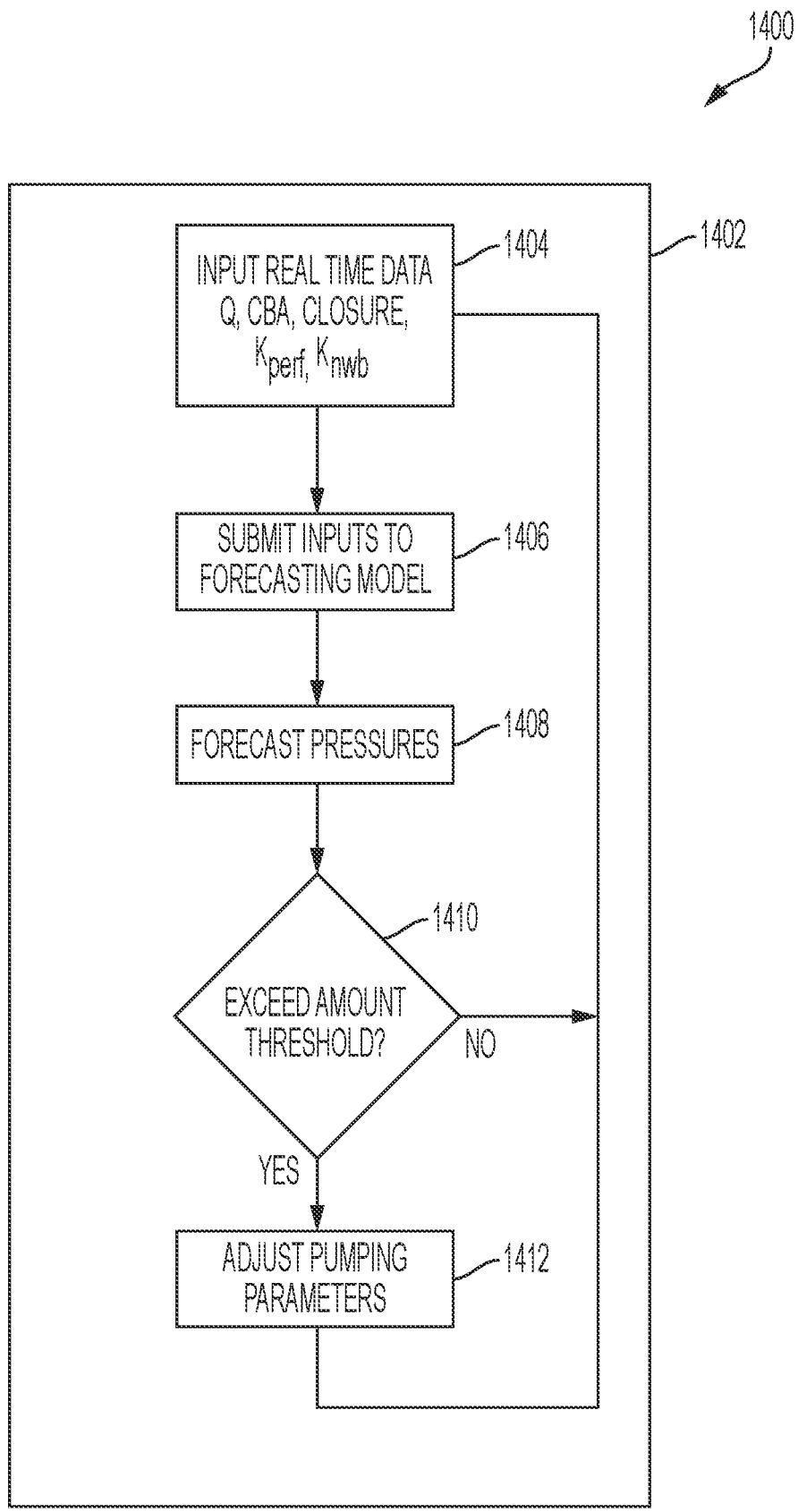
FIG. 14 is flowchart of program logic implementing the hybrid model according to one embodiment.

FIG. 14 shows program logic 1400 that, when active on a computer, forms a CPU-resident program module 1402. Data is gathered 1404 for input, for example, using a graphical user interface or API (not shown) including such data as is required for the hybrid model as discussed above. This input data is associated with an individual well undergoing a hydraulic fracturing operation such that any data which changes with time, such as the flow rate or density of frac fluid is provided in real time. As used herein, the term "frac fluid" encompasses liquids, such as water, acid, viscosifiers, and friction reducers that are commonly utilized in hydraulic fracturing operations together with slurries formed of these fluids mixed with proppant, such as sand. The input data may, for example, include parameters of projected frac fluid design flow rate Q over time, bottomhole proppant concentration $C_{BH}$ fracture closure pressure $\sigma_{closure}$, perforation friction multiplier $K_{perf}$ and near-wellbore friction multiplier $k_{nwb}$. The input data is submitted 1406 in real time for use by the hybrid model described above to forecast 1408 pressures over a predetermined interval of time, such as fifteen or thirty minutes or more, as a hydraulic fracturing operation is underway on an individual well. If it is determined 1410 that pressure parameters have exceeded a predetermined threshold, then the system alarms, prompting a frac operator to adjust pumping parameters 1412 according to the various options as are known in the art for mitigating a screen-out.

It will be appreciated that the program logic 1400 may reside on a non-transitory computer readable medium, which may be used to store and/or transfer software that embodies the program logic 1400.

Figure 15:
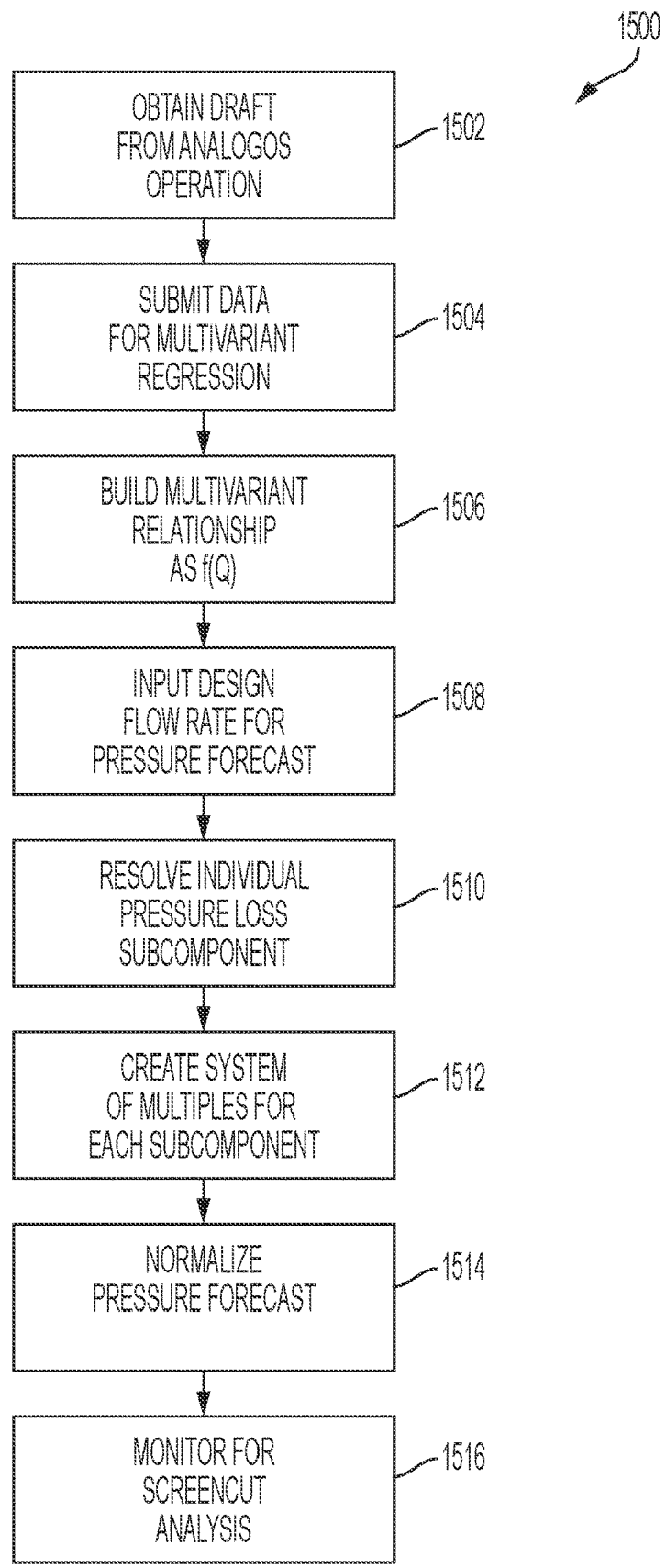
FIG. 15 is a process diagram showing the various steps of constricting a hybrid model according to one embodiment of the presently disclosed instrumentalities.

FIG. 15 shows a method 1500 of creating the hybrid statistical model according to one embodiment. As an analogous hydraulic fracturing operation is being performed, observed pressure and flowrate data is obtained 1502. Additional data may include any of the values obtained above and may be obtained by direct measurements or by analogy to other wells, fields, or producing basins. An analogous data sources for this data may include, for example, an operation on a well that resides nearby in close proximity to a well for which a hydraulic fracturing operation is being planned, a hydraulic fracturing operation performed on a prior stage of the same well, operations performed on a group of nearby wells, or a group of wells in the same field or producing basin.

The data is submitted 1504 as a training data set to a statistical processing package, such as Simulink® and Matlab©, SAS™, StatSim, or R. The statistical processing package builds 1506 a multivariate relationship utilizing, by way of example, flowrate as input 1508 to generate a calculated pressure which may be a surface pressure or a bottomhole pressure or any of the pressure loss subcomponents discussed. The calculated pressure is resolved 1510 into pressure loss subcomponents as discussed above, and a system of multipliers created 1512 for use with each pressure loss subcomponent utilizing the methodology discussed above in context of FIG. 13. It will be appreciated that each data point may be associated with its own unique multiplier in this manner. The pressure loss subcomponents are then normalized 1514. This n normalization produces a normalized pressure forecast based upon the design rate data. The normalized pressure forecast may be presented to monitor each of the pressure loss subcomponents, which may also be combined for to an overall pressure total pressure such as $P_{bottomhole}$ or $P_{surface}$. The forecast pressure is monitored 1516, such as by threshold analysis to assess an impending screen-out as discussed above.

Those skilled in the art will appreciate that many of the monitorable parameters are mathematically related and, consequently, different variables as discussed above may be In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

Generally speaking, a computer-accessible medium may include any tangible or non-transitory storage media or memory media such as electronic, magnetic, or optical media—e.g., disk or CD/DVD-ROM coupled to a computer system. The terms "tangible" and "non-transitory," as used herein, are intended to describe a computer-readable storage medium (or "memory") excluding propagating electromagnetic signals but are not intended to otherwise limit the type of physical computer-readable storage device that is encompassed by the phrase computer-readable medium or memory and may include, for example, nonvolatile memory. For instance, the terms "non-transitory computer-readable medium" or "tangible memory" are intended to encompass types of storage devices that do not necessarily store information permanently, including for example, random access memory (RAM). Unless otherwise specified, the term "non-transitory", as used herein, is a limitation of the medium itself (i.e., tangible, not a signal) as opposed to a limitation on data storage persistency (e.g., RAM vs. ROM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Embodiments of the systems and methods described herein may be implemented in a variety of systems including, but not limited to, smartphones, tablets, laptops, and combinations of computing devices and cloud computing resources. For instance, portions of the operations may occur in one device, and other operations may occur at a remote location, such as a remote server or servers. For instance, the collection of the data may occur at a smartphone, and the data analysis may occur at a server or in a cloud computing resource. Any single computing device or combination of computing devices may execute the methods described.

In various instances, parts of the method may be implemented in modules, subroutines, or other computing structures. In many embodiments, the method and software embodying the method may be recorded on a fixed tangible medium.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

REFERENCES

The following references contain technical subject matter supporting the discussion above and are hereby incorporated by reference to the same extent as though fully replicated herein:

(1) Clifton and Abou-Sayed, "A Variational Approach to the Prediction of the Three-Dimensional Geometry of Hydraulic Fractures," SPE/DOE-9879, dated May 27-28, 1981, 9 pages.
(2) Clifton and Wang, "Multiple Fluids, Proppant Transport, and Thermal Effects in Three-Dimensional Simulation of Hydraulic Fracturing," SPE-18198, dated Oct. 2-5, 1988, 14 pages.
(3) Cleary, "Comprehensive Design Formulae for Hydraulic Fracturing," SPE-9259, dated Sep. 21-24, 1980, 20 pages.
(4) Cleary et al., "Development of a Fully Three-Dimensional Simulator for Analysis and Design of Hydraulic Fracturing," SPE/DOE-11631, dated Mar. 14-16, 1983, 12 pages.
(5) Crockett et al., "A Complete Integrated Model for Design and Real-Time Analysis of Hydraulic Fracturing Operations," SPE-15069, dated Apr. 2-4, 1986, 13 pages.
(6) Settari and Cleary, "Development and Testing of a Pseudo-Three-Dimensional Model of Hydraulic Fracture Geometry," SPE-10505, dated November 1986, 30 pages.
(7) Palmer and Luiskutty, "A Model of the Hydraulic Fracturing Process for Elongated Vertical Fractures and Comparisons of Results with Other Models," SPE/DOE-13864, dated May 19-22, 1985, 17 pages.
(8) Thiercelin et al., "Simulation of Three-Dimensional Propagation of a Vertical Hydraulic Fracture," SPE/DOE-13861, dated May 19-22, 1985, 12 pages.
(9) Smith et al., "Layered Modulus Effects on Fracture Propagation, Proppant Placement, and Fracture Modeling," SPE-71654, dated Sep. 39-Oct. 3, 2001, 14 pages.
(10) Barree, "A Practical Numerical Simulator for Three-Dimensional Fracture Propagation in Heterogeneous Media," SPE-12273, dated Nov. 15-18, 1983, 12 pages.
(11) Meyer, "Design Formulae for 2-D and 3-D Vertical Hydraulic Fractures: Model Comparison and Parametric Studies," SPE-15240, dated May 18-21, 1986, 18 pages.
(12) Meyer, "Three-Dimensional Hydraulic Fracturing Simulation on Personal Computers: Theory and Comparison Studies," SPE-19329, dated Oct. 24-27, 1989, 18 pages.
(13) Weijers et al., "The Rate Step-Down Test: A Simple Real-Time Procedure to Diagnose Potential Hydraulic Fracture Treatment Problems," SPE-62549, dated 2000, 11 pages.
(14) Barree et al., "Holistic Fracture Diagnostics: Consistent Interpretation of Prefrac Injection Tests Using Multiple Analysis Methods," SPE-107877-PA, dated Apr. 4, 2008, 11 pages.
(15) Mayerhofer and Economides, "Fracture Injection Test Interpretation: Leakoff Coefficient vs. Permeability Estimation," SPE-28562, dated Sep. 25-28, 1994, 10 pages.
(16) Craig et al., "Fracture Closure Stress: Reexamining Field and Laboratory Experiments of Fracture Closure Using Modern Interpretation Methodologies," SPE-187038-MS, dated Oct. 9-11, 2017, 27 pages.

We claim:

1. A system for forecasting pressures in a hydraulic fracturing system for a well, the system comprising:
a processing module executing code and configured to:
receive specifications for performing a hydraulic fracturing operation on a well, the specifications forecasting an array of flow rate information for frac fluid over time;
submit the array of flow rate information to a model incorporating a statistically based multivariate relationship operating on the flowrate information to forecast pressure results including at least one of a bottomhole pressure time-based array and a surface pressure time based array, each of the pressure results being separable into pressure loss subcomponents,
determine a system of multipliers for statistical normalization of the pressure loss subcomponents,
calculate normalized pressure loss subcomponents obtained by multiplying the pressure loss subcomponents by selected multipliers obtained from the system of multipliers, and
provide normalized pressure forecast data on a basis of the normalized pressure loss subcomponents;
monitor observed pressure from the well as the hydraulic fracturing operation is underway by comparing the normalized pressure forecast data over time to the observed pressure from the well; and
take responsive action when monitoring of the observed pressure indicates an impending screen-out.

2. The system of claim 1 wherein the array of flow rate information is associated with a second set of pressure forecast results obtained from a lumped 3D hydraulic fracturing model.

3. The system of claim 1 wherein the statistically based multivariate relationship derives from a training data set incorporating historical data from at least one analogous hydraulic fracturing operation, the historical data including time-based arrays of at least two variables selected form the group consisting of historical flow rate (Q), historical surface pressure data ($P_{surface}$), historic bottomhole pressure data ($P_{bottomhole}$), entry pressure ($P_{entry}$), bottomhole proppant concentration ($C_{BH}$), net pressure ($P_{net}$), friction reducer concentration (FR), and fracture closure pressure ($\sigma_{closure}$).

4. The system of claim 3 wherein the time-based arrays include at least three of the variables.

5. The system of claim 3 wherein the time-based arrays include at least four of the variables.

6. The system of claim 3 wherein the time-based arrays include at least five of the variables.

7. The system of claim 3 wherein the time-based arrays include at least six of the variables.

8. The system of claim 3 wherein the training data contains historical information from diagnostic fracture injection tests, and the statistical model relates the historical information from diagnostic fracture injection tests to new data obtained from a diagnostic fracture injection test performed on the well.

9. The system of claim 3 wherein the training data contains historical information from stepdown test, and the statistical model relates the historical information from diagnostic fracture injection tests to new data obtained from a stepdown test performed on the well.

10. The system of claim 3 wherein the training data set includes historical data from a prior stage of hydraulic fracturing performed on the well.

11. The system of claim 3 wherein the training data set includes historical data from the same stage of the hydraulic fracturing operation as the hydraulic fracturing operation of the same stage remains underway.

12. The system of claim 1 wherein the following relationships characterize the pressure results and pressure loss subcomponents:

$$p_{bottomhole} = \sigma_{closure} + M_{net} p_{net,DFIT} \left(\frac{Q_{forecast}}{Q_{DFIT}}\right)^{\beta_{net}} +$$

$$M_{nwb,Q} k_{nwb} Q^{\beta_{nwb}} + M_{nwb,C} C_{BHprop} + M_{perf,Q} k_{perf} Q^{\beta_{perf}}$$

$$p_{surface} = p_{bottomhole} - \int_{surface}^{bottomhole} \rho_z g \, dz +$$

$$\sum_{segment1}^{i} p_{Fracpro,wellfriction,Q,C} M_{friction,Q} M_{friction,C}$$

wherein $\sigma_{closure}$ is fracture closure pressure, $M_{net}$ is a multiplier used to normalize net pressure; $p_{net,\ DFIT}$ is net pressure (fracture opening pressure) obtained from a diagnostic fracture injection test; $Q_{forecast}$ is a design rate of fluid flow from a lumped 3D fracture model; $Q_{DFIT}$ is the flowrate used in a DFIT to assess $p_{net}$; $M_{nwb,Q}$ is a multiplier used to normalize near wellbore pressure losses that are sensitive to Q; $K_{nwb}$ is a multiplier relating flowrate to near-wellbore pressure loss, Q is flowrate of injected frac fluid including proppant; $M_{nwb,C}$ is a multiplier used to normalize near wellbore pressure as a function of bottomhole proppant concentration, $C_{BHprop}$ is bottomhole proppant concentration, $M_{perf,Q}$ is a multiplier used to normalize pressure loss due to flowing frac fluid at flowrate Q; $K_{perf}$ is a multiplier relating Q to frictional pressure loss through perforations in casing that lines a wellbore; $p_z$ is pressure at a depth Z; g is a gravitational constant; $P_{Fracpro,well\ friction,Q,C}$ is frictional pressure loss calculated from a lumped 3D fracture model when flowing frac fluid including proppant at a rate Q with bottomhole proppant concentration $C_{BHprop}$; $M_{friction,Q}$ is a multiplier used to normalize pressure losses due to wellbore friction at flowrate Q; $M_{friction,C}$ is a multiplier used to normalize pressure losses due to wellbore friction at bottomhole proppant concentration $C_{BHprop}$; $\beta_{net}$ is a rate sensitive power factor for calculating $p_{net}$; $\beta_{nwb}$ is a power factor for calculating near wellbore pressure losses, and $\beta_{perf}$ is a power factor that is used for calculating pressure drop through the perforations; i is an integer, wherein DFIT stands for diagnostic fracture injection testing and $p_{bottomhole}$ is the pressure at a bottom of the hole and $p_{surface}$ is a pressure at the surface of the well.

13. The system of claim 1 wherein the system of multipliers includes at least one relationship for determining net pressure multipliers ($M_{net}$) for mitigating error from statistical modeling of net pressure ($p_{net}$) based upon data obtained from stepdown tests performed on the plurality of wells.

14. The system of claim 1 wherein the system of multipliers includes at least one relationship for mitigating error in pressure loss from wellbore friction ($p_{wellfriction,Q,C}$) as a function of flowrate (Q).

15. The system of claim 1 wherein the system of multipliers includes at least one relationship for mitigating error in pressure loss from wellbore friction ($p_{wellfriction,Q,C}$) as a function of bottomhole proppant concentration ($C_{BH}$).

16. The system of claim 1 wherein the appropriate action is to initiate an alarm to alert a frac operator when the risk of screen-out is elevated.

17. The system of claim 1 wherein the code is further configured to interact with a user through use of a graphical user interface to facilitate the appropriate action including at least on action is selected from the group consisting of: (1) adding friction reducer to the frac fluid, increasing the flow rate of the frac fluid, and (2) reducing proppant concentration in the frac fluid.

18. The system of claim 1 wherein the responsive action is determined as a result of threshold analysis.

19. The system of claim 18 wherein the threshold analysis utilizes a probabilistic threshold on a plot of actual pressure ($P_{actual}$) versus forecast pressure ($P_{forecast}$).

20. The system of claim 19 wherein the probabilistic threshold is based upon a Gaussian distribution utilizing as a mode of the Gaussian distribution a least squares fit of a dataset comprised of the ($P_{actual}$, $P_{forecast}$) values.

21. The system of claim 18 wherein the threshold analysis is based upon a contemporaneous comparison of slopes between those of the observed pressure and the normalized pressure forecast data.

22. The system of claim 1 wherein the normalized pressure forecast data includes that for fracture entry pressure ($P_{entry\ friction}$), which is monitored for the purpose of taking appropriate action.

23. A system for forecasting pressures in a hydraulic fracturing system for a well, the system comprising:
a processing module executing code and configured to:
receive specifications for performing a hydraulic fracturing operation on a well, the specifications forecasting flow rate information for frac fluid over time;
submit the flow rate information to a statistical model, the statistical model incorporating pressure loss subcomponents and multipliers for the pressure loss subcomponents for normalizing their expected contribution to pressure loss resulting in normalized pressure loss subcomponents;
provide normalized pressure forecast data on a basis of the normalized pressure loss subcomponents;
monitor observed pressure from the well as the hydraulic fracturing operation is underway to create an observed pressure model;
combining the normalized pressure forecast data and the observed pressure model to operate well pumping activities, including predicting an unexpected event outside of the normalized pressure forecast data;
take responsive action to the unexpected event.

24. The system of claim 23, wherein the predicting the unexpected events results from comparing the normalized pressure forecast data to the observed pressure model.

25. The system of claim 23, wherein the unexpected event is an impending screen-out.

26. The system of claim 23, wherein the responsive action is selected from a group consisting of an alarm, a dump of friction reducer, a change of pumping pressure, and a change in proppant concentration.

* * * * *